(12) United States Patent
Makuta et al.

(10) Patent No.: US 7,866,807 B2
(45) Date of Patent: Jan. 11, 2011

(54) INK SET FOR INK JET RECORDING, INK FOR INK JET RECORDING, AND INK JET IMAGE RECORDING METHOD

(75) Inventors: Toshiyuki Makuta, Ashigarakami-gun (JP); Shigetomo Tsujihata, Ashigarakami-gun (JP); Masaaki Konno, Ashigarakami-gun (JP); Tetsuzo Kadomatsu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 498 days.

(21) Appl. No.: 11/886,998

(22) PCT Filed: Mar. 31, 2006

(86) PCT No.: PCT/JP2006/307405

§ 371 (c)(1),
(2), (4) Date: Sep. 24, 2007

(87) PCT Pub. No.: WO2006/104281

PCT Pub. Date: Oct. 5, 2006

(65) Prior Publication Data

US 2009/0081367 A1    Mar. 26, 2009

(30) Foreign Application Priority Data

| Mar. 31, 2005 | (JP) | ............................. 2005-105143 |
| Mar. 31, 2005 | (JP) | ............................. 2005-105145 |
| Mar. 31, 2005 | (JP) | ............................. 2005-105206 |
| Apr. 6, 2005 | (JP) | ............................. 2005-110291 |
| Sep. 30, 2005 | (JP) | ............................. 2005-289360 |
| Jan. 23, 2006 | (JP) | ............................. 2006-014292 |

(51) Int. Cl.
*G01D 11/00* (2006.01)

(52) U.S. Cl. .................. 347/100; 106/31.13; 106/31.6; 523/160

(58) Field of Classification Search ........... 347/95–102; 523/160; 106/31.13, 31.6
See application file for complete search history.

(56) References Cited

U.S. PATENT DOCUMENTS

| 4,303,924 | A | 12/1981 | Young, Jr. | |
| 2003/0021961 | A1* | 1/2003 | Ylitalo et al. ................ | 428/195 |
| 2003/0118791 | A1* | 6/2003 | Yoshimura et al. .......... | 428/195 |
| 2003/0222959 | A1* | 12/2003 | Yamanouchi et al. ....... | 347/100 |
| 2004/0024078 | A1 | 2/2004 | Itoh et al. | |
| 2004/0101640 | A1* | 5/2004 | Tsujihata et al. ........... | 428/32.1 |

FOREIGN PATENT DOCUMENTS

| EP | 0465039 | A1 | | 1/1992 |
| JP | 63-60783 | A | | 3/1988 |
| JP | 5-214279 | A | | 8/1993 |
| JP | 7-109431 | A | | 4/1995 |
| JP | 8-174997 | A | | 7/1996 |
| JP | 10-287035 | A | | 10/1998 |
| JP | 2000-37943 | A | | 2/2000 |
| JP | 2000-158793 | A | | 6/2000 |
| JP | 2002-167537 | A | | 6/2002 |
| JP | 2002-302629 | A | | 10/2002 |
| JP | 2003012971 | A | * | 1/2003 |
| JP | 2003-221521 | A | | 8/2003 |
| JP | 3478495 | B | | 10/2003 |
| JP | 2005-15672 | A | | 1/2005 |
| WO | WO 00/30856 | A1 | | 6/2000 |

* cited by examiner

*Primary Examiner*—Matthew Luu
*Assistant Examiner*—Rut Patel
(74) *Attorney, Agent, or Firm*—Sheldon J. Moss; Chad M. Herring

(57) ABSTRACT

An ink set for ink jet recording, an ink for ink jet recording and an ink jet recording method capable of suppressing bleeding and the interference between discharged droplets to form high-quality images can be achieved by an ink set for ink jet recording, having plurality of liquids containing at least a first liquid and a second liquid, wherein the first liquid has an oil-soluble polymer dissolved therein, and at least one of a plurality of the liquids contains a polymerizable compound, as well as by an ink jet image recording method which uses the ink set and applying the first and second liquids simultaneously onto a recording medium, or first applying one of the liquids and then the other onto a recording medium such that the two liquids contact each other to form an image.

13 Claims, No Drawings

INK SET FOR INK JET RECORDING, INK FOR INK JET RECORDING, AND INK JET IMAGE RECORDING METHOD

TECHNICAL FIELD

The present invention relates to an ink set for ink jet recording, an ink for ink jet recording, and an ink jet image recording method. Specifically, the invention relates to an ink set for ink jet recording and an ink for ink jet recording which are used in an ink jet image recording method of multi-liquid flocculation type, and an ink jet recording method capable of forming high-quality images.

BACKGROUND ART

An ink jet system of discharging ink through ink-discharging openings such as nozzles is used in many printers because the system is compact, inexpensive and capable of forming an image on a printing medium without contacting therewith. In the ink jet system, a piezo ink jet system of discharging ink by utilizing deformation of a piezoelectric element or a thermal ink jet system of discharging ink by utilizing the boiling phenomenon of ink with thermal energy is characterized by excellent properties such as high resolution and high-speed printing.

At present, raising the speed and improving the image quality when printing on paper or a non-water-absorptive recording medium such as plastics are critical issues. This is because there are practical problems wherein particularly when the drying of liquid droplets takes time after printing, image bleeding occurs easily, and interference between discharged droplets occurs upon mixing of adjacent ink droplets, thus preventing formation of sharp images, and when a non-water-absorptive recording medium is used, the drying of a solvent is very slow, which may necessitate drying of printed materials just after printing without laying the printed materials one on top of another. The interference between discharged droplets refers to the phenomenon where adjacently discharged liquid droplets unite with each other because of the tendency of the adjacently discharged liquid droplets to reduce their surface energy (and to decrease their surface area). Upon unification of adjacently discharged liquid droplets, the liquid droplets shift from the position of impact on a recording medium so that particularly when a thin line is drawn with colorant-containing ink, the width of the line is made uneven, and when a solid image is drawn, the solid image is made uneven.

To suppress the bleeding of an image and the interference between discharged droplets, an ink for ink jetting which is fixed by curing not through evaporation of an ink solvent but with radiation is proposed (see, for example, Japanese Patent Application Laid-Open (JP-A) No. 5-214279) as one technique of accelerating the curing of ink. However, a pigment dispersion is used as a coloring component, and flocculation of the pigment causes clogging of nozzles to make stable discharge of ink difficult.

To form images excellent in transparency and hue without using any pigment, UV-curing ink using a dye as a colorant is also disclosed (see, for example, U.S. Pat. No. 4,303,924). This ink suffers from a problem of insufficient storage stability since undesirable polymerization reaction occurs easily during storage. Further, the ink contains electroconductive salts that are sometimes poor in solubility in ink, so there is concern about defective printing due to precipitation of the salts during long-term storage.

To satisfy both storage stability and high-speed drying characteristics, a technique of using an ink of two-liquid type to react the two on a recording medium is proposed; for example, there are disclosed a method which involves allowing a liquid having a basic polymer to adhere to a recording medium and then using an anionic dye-containing ink in recording (see, for example, JP-A No. 63-60783), a method that involves applying a cationic substance-containing liquid composition and then applying an anionic compound- and colorant-containing ink (see, for example, JP-A No. 8-174997), and a recording method of using a photo-setting resin in one liquid and a photopolymerization initiator-containing ink in the other liquid (see, for example, Japanese Patent No. 3478495).

However, these methods suppress the bleeding of an image by precipitation of a dye itself and are not capable of suppressing the interference between discharged droplets, and since an aqueous solvent is contained, the drying speed is slow, and further a precipitated dye can easily spread unevenly on a recording medium causing deterioration in image quality.

DISCLOSURE OF THE INVENTION

The ink set for ink jet recording according to the invention as follows:

<1> An ink set for ink jet recording comprising a plurality of liquids containing at least a first liquid and a second liquid, wherein the first liquid comprises an oil-soluble polymer dissolved therein, and at least one of a plurality of the liquids contains a polymerizable compound. (hereinafter, referred to the first mode of the invention)

<2> The ink set for ink jet recording of <1>, wherein the oil-soluble polymer is at least one member selected from the group consisting of a polymer having a nitrogen-containing heterocycle, a polymer having an onium group, and a polymer having an amino group.

<3> The ink set for ink jet recording of any one of <1>, wherein the second liquid contains a colorant.

<4> The ink set for ink jet recording of any one of <1>, wherein the second liquid contains the polymerizable compound.

<5> The ink set for inkjet recording of any one of <1>, wherein the weight-average molecular weight of the oil-soluble polymer is 1,000 to 50,000.

<6> The ink set for ink jet recording of any one of <2>, wherein the polymer having a nitrogen-containing heterocycle is a polymer having at least one member selected from the group consisting of N-vinyl imidazole, 2-vinyl pyridine and 4-vinyl pyridine.

<7> The ink set for ink jet recording of any one of <2>, wherein the polymer having an onium group is a polymer having an ammonium group.

<8> The ink set for ink jet recording of <7>, wherein the polymer having an onium group is a polymer having a unit represented by the following formula (1) or (2):

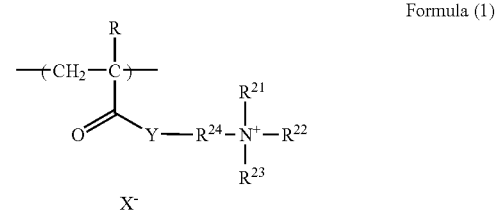

Formula (1)

-continued

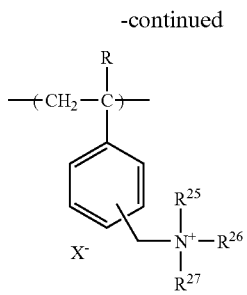

Formula (2)

wherein R represents a hydrogen atom or a methyl group, $R^{21}$ to $R^{23}$ and $R^{25}$ to $R^{27}$ independently represent an alkyl group, aralkyl group or aryl group; $R^{24}$ represents an alkylene group, aralkylene group or arylene group; Y represents O or NR', and R' represents a hydrogen atom or an alkyl group; and $X^-$ represents a counter anion.

<9> The ink set for ink jet recording of any one of the above-mentioned <2> to <8>, wherein the polymer having an amino group is a polymer having a unit represented by the following formula (3):

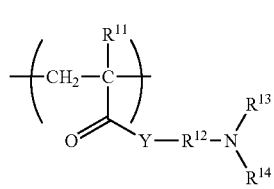

Formula (3)

wherein $R^{11}$ represents a hydrogen atom or a methyl group, Y represents O or $NR^{15}$, $R^{15}$ represents a hydrogen atom or an alkyl group, $R^{12}$ represents a divalent linking group, and $R^{13}$ and $R^{14}$ independently represent an alkyl group, aralkyl group or aryl group.

<10> The ink set for ink jet recording of any one of <1>, wherein a high-boiling organic solvent is contained in at least one of the liquids containing the oil-soluble polymer.

<11> The ink set for ink jet recording of any one of <1>, wherein if a plurality of the liquids contain a solvent, the solvent does not substantially contain a water-soluble liquid.

<12> The ink set for ink jet recording of <3>, wherein the colorant is a pigment.

<13> An ink jet image recording method which comprises using the ink set for ink jet recording having a plurality of liquids containing at least the first and second liquids of <1>, and applying the first and second liquids simultaneously onto a recording medium, or first applying one of the liquids and then the other onto a recording medium such that the two liquids contact each other, thus forming an image.

(hereinafter, referred to as the second mode of the invention)

<14> The ink jet image recording method of <13>, wherein the first liquid is applied onto a recording medium and simultaneously or thereafter the second liquid is jetted through ink jet nozzles, thereby forming an image.

<15> The ink jet image recording method of <13>, wherein the means of applying the first liquid onto a recording medium is coating by an applicator, and after the first liquid is applied, the second liquid is jetted via ink jet nozzles.

<16> The ink jet image recording method of <13>, wherein the means of applying the first and second liquids onto a recording medium is jetting through ink jet nozzles.

<17> The ink jet image recording method of any one of <13>, further comprising fixing an image formed on a recording medium by applying energy to the image.

<18> An ink for ink jet recording, which comprises at least a high-boiling organic solvent and an oil-soluble polymer.

(hereinafter, referred to as the third mode of the invention)

<19> The ink for ink jet recording of <18>, wherein the oil-soluble polymer is at least one member selected from the group consisting of a polymer having a nitrogen-containing heterocycle, a polymer having an onium group, and a polymer having an amino group.

<20> The ink for ink jet recording of <18>, which further comprises a polymerization initiator.

According to the invention, there can be provided an ink set for ink jet recording and an ink for ink jet recording, which can maintain long-term storage stability and excellent fixability and suppress bleeding and the interference of adjacent droplets of jetting ink, to form high-quality images.

Further, there can be provided an ink jet image recording method capable of forming high-quality images while maintaining excellent fixability and suppressing bleeding and the interference of adjacent droplets of jetting ink.

BEST MODE FOR CARRYING OUT THE INVENTION

Hereinafter, the ink set for ink jet recording in the first mode of the present invention, the ink for ink jet recording in the third mode of the invention and the ink jet image recording method in the second mode of the invention are described in detail in this order.

<Ink Set for Ink Jet Recording: First Mode of the Invention>

The ink set for ink jet recording according to the invention (hereinafter, referred to sometimes as "ink set") is composed of a plurality of liquids containing at least a first liquid and a second liquid, wherein the first liquid comprises an oil-soluble polymer dissolved therein, and at least one of a plurality of the liquids contains a polymerizable compound.

As used herein, the term "dissolved" means that the oil-soluble polymer is dissolved in an amount of 0.05 g/cm³ or more in the first liquid. For dissolving the oil-soluble polymer in this range in the first liquid, it is preferable for the first liquid itself to be oleaginous, and if the first liquid contains a solvent, the solvent used is preferably a high-boiling organic solvent, and preferably the solvent does substantially not contain a water-soluble solvent.

By using the first liquid, the oil-soluble polymer contained therein suppresses diffusion of a colorant on a recording medium, and as a result, bleeding and interference between discharged droplets can be effectively prevented, thus giving an image free of color segregation.

The oil-soluble polymer is preferably at least one member selected from the group consisting of a polymer having a nitrogen-containing heterocycle, a polymer having an onium group, and a polymer having an amino group.

From the viewpoint of the property of the invention in allowing the oil-soluble polymer to suppress diffusion of a colorant on a recording medium, the oil-soluble polymer and the colorant are contained in different liquids, and preferably the first liquid containing the oil-soluble polymer does substantially not contain a colorant, while the second liquid preferably contains a colorant. Accordingly, it is preferable that the second liquid containing a colorant does substantially not contain the oil-soluble polymer.

It is also preferable that a polymerizable compound is contained in the second liquid. In another preferable mode, a polymerizable compound is contained in both the first and second liquids in order to make the two liquids excellent in compatibility.

From the viewpoint of attaining excellent fixability, it is preferable in the invention that at least one of a plurality of liquids (including the first and second liquids) constituting the ink set described above contains a polymerization initiator for curing the polymerizable compound. From the viewpoint of liquid stability, the polymerization initiator is contained preferably in a liquid not containing the polymerizable compound.

Hereinafter, the components constituting a plurality of the liquids are first illustrated to describe the invention in detail.

[Oil-Soluble Polymer]

In the invention, the oil-soluble polymer refers to a polymer having a solubility of 0.01 g/cm$^3$ or less in water. As described above, the oil-soluble polymer is estimated to suppress diffusion of the colorant on a recording medium. The oil-soluble polymer is not particularly limited insofar as it corresponds to the polymer defined above. Specific examples of the oil-soluble polymer in the invention include oil-soluble high-molecular polymers containing monomers such as, for example, alkyl (meth)acrylates [for example, (C1 to C18) alkyl (meth)acrylates such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate and stearyl (meth)acrylate], cycloalkyl (meth)acrylate [cyclohexyl (meth)acrylate etc.], aryl (meth)acrylates [phenyl (meth)acrylate etc.], aralkyl (meth)acrylates [benzyl (meth) acrylate etc.], substituted alkyl (meth)acrylates [for example, 2-hydroxyethyl (meth)acrylate etc.], (meth)acrylamides [for example, (meth)acrylamide, dimethyl (meth)acrylamide etc.], aromatic vinyls [styrene, vinyl toluene, α-methyl styrene etc.], vinyl esters [vinyl acetate, vinyl propionate, vinyl varsate etc.], allyl esters [allyl acetate etc.], halogen-containing monomers [vinylidene chloride, vinyl chloride etc.], vinyl cyanides [(meth)acrylonitrile etc.] and olefins [ethylene, propylene etc.].

Among these copolymerizable monomers, alkyl (meth) acrylates, (meth)acrylamides and aromatic vinyls are preferable, among which methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, 2-hydroxyethyl (meth)acrylate and styrene are particularly preferable.

Oil-soluble polymer compounds having a monomer having a nitrogen-containing heterocyclic group, a monomer having an onium group or a monomer having an amino group copolymerized with these polymers are also preferable modes. The oil-soluble polymer is more preferably at least one member selected from the group consisting of the polymer having a nitrogen-containing heterocyclic group, the polymer having an onium group, and the polymer having an amino group.

The weight-average molecular weight of the oil-soluble polymer is preferably 1,000 to 50,000, more preferably 2,000 to 30,000. In the invention, the weight-average molecular weight is defined as a value measured by GPC (gel permeation chromatography). Specifically, the weight-average molecular weight refers to a value determined in gel permeation chromatography (SCL-6B, manufactured by Shimadzu Corporation) using polystyrene as standard, by injecting 15 μl sample at a concentration of 8 mg (sample)/20 ml (tetrahydrofuran) and passing a solvent (tetrahydrofuran) at a flow rate of 0.8 ml/min. through Shodex-KF804 as GPC column.

In the invention, the oil-soluble polymer is contained in the first liquid. The amount of the oil-soluble polymer used in the invention is preferably 0.05 to 90 mass %, more preferably 1 to 75 mass %, still more preferably 1.5 to 50 mass %. When the amount of the oil-soluble polymer used is smaller than this range, the effect of the invention cannot be effectively demonstrated in some cases, while when the amount is higher than the above range, the liquid is so viscous that the discharge of the ink liquid may be problematic.

Liquids (second liquid etc.) other than the first liquid may or may not contain the oil-soluble polymer, but preferably these liquids do substantially not contain the oil-soluble polymer. Specifically, the content of the oil-soluble polymer, particularly the content of the oil-soluble polymer in the liquid containing a colorant is preferably 0 to 10 mass %, more preferably 0 to 5 mass %.

(Polymer Having a Nitrogen-Containing Heterocycle)

The polymer having a nitrogen-containing heterocycle may be a homopolymer consisting exclusively of a monomer having a nitrogen-containing heterocycle, or may be a copolymer of a monomer having a nitrogen-containing heterocycle with another monomer. In the constitution of the polymer having a nitrogen-containing heterocycle, the monomer having a nitrogen-containing heterocycle is preferably 10 mol % or more, more preferably 20 mol % or more.

Specifically, the nitrogen-containing heterocycle includes saturated heterocycles (for example, aziridine, azetidine, pyrrolidine, piperidine, piperazine, morpholine, thiomorpholine, caprolactam, valerolactam) and unsaturated heterocycles (for example, imidazole, pyridine, pyrrole, pyrazole, pyrazine, pyrimidine, indole, purine, quinoline, triazine etc.).

These nitrogen-containing heterocycles may further have a substituent group, and the substituent group includes an alkyl group, aryl group, alkoxy group, aryloxy group, halogen atom, hydroxyl group, carbamoyl group, amino group etc.

The polymer according to the invention is preferably a polymer obtained from vinyl monomers having these nitrogen-containing heterocycles. Specific examples include N-vinyl pyrrolidone, N-vinyl caprolactam, acryloyl morpholine, acryloyl thiomorpholine, N-vinyl imidazole, 2-methyl-1-vinyl imidazole, 2-vinyl pyridine, 4-vinyl pyridine, N-vinyl carbazole, N-methyl maleimide, N-ethyl maleimide, 2-isopropenyl-2-oxazoline etc. Among these, N-vinyl imidazole, 2-vinyl pyridine and 4-vinyl pyridine are particularly preferable.

The polymer according to the invention may be a copolymer of the above monomer with a monomer copolymerizable therewith. The copolymerizable monomer includes, for example, alkyl (meth)acrylates [for example, (C1 to C18) alkyl (meth)acrylates such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate and stearyl (meth)acrylate], cycloalkyl (meth)acrylates [cyclohexyl (meth)acrylate etc.], aryl (meth)acrylates [phenyl (meth)acrylate etc.], aralkyl (meth)acrylates [benzyl (meth) acrylate etc.], substituted alkyl (meth)acrylates [for example, 2-hydroxyethyl (meth)acrylate etc.], (meth)acrylamides [for example, (meth)acrylamide, dimethyl (meth)acrylamide etc.], aromatic vinyls [styrene, vinyl toluene, α-methyl styrene etc.], vinyl esters [vinyl acetate, vinyl propionate, vinyl varsate etc.], allyl esters [allyl acetate etc.], halogen-containing monomers [vinylidene chloride, vinyl chloride etc.], vinyl cyanides [(meth)acrylonitrile etc.] and olefins [ethylene, propylene etc.].

Among these copolymerizable monomers, alkyl (meth) acrylates, (meth)acrylamides and aromatic vinyls are preferable, among which methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, 2-hydroxyethyl (meth)acrylate and styrene are particularly preferable.

In the structure of the polymer having a nitrogen-containing heterocycle, the monomer having a nitrogen-containing heterocycle is preferably 10 to 100 mol %, more preferably 20 to 100 mol %.

These polymers can be synthesized by radical (co)polymerization of the monomers described above. As radical polymerization, a known method such as bulk polymerization, solution polymerization or emulsion polymerization can be used. If necessary, a polymerization initiator and catalyst known to those skilled in the art can be used.

The polymer according to the invention may also be obtained by polycondensation. Mention can be made of polymers obtained by polycondensation of 2,4-dichlorotriazine (for example, 2,4-dichloro-6-butylamino-1,3,5-triazine) with diamine (for example, N,N'-dimethyl ethylene diamine, N,N'-dimethyl hexamethylene diamine, N,N'-dibutyl hexamethylene diamine, N,N'-dioctyl hexamethylene diamine etc.), or polymers obtained by copolymerization of piperazine with a dicarboxylic acid (for example adipic acid) ester.

Preferable nitrogen-containing heterocycle polymers include the following examples:

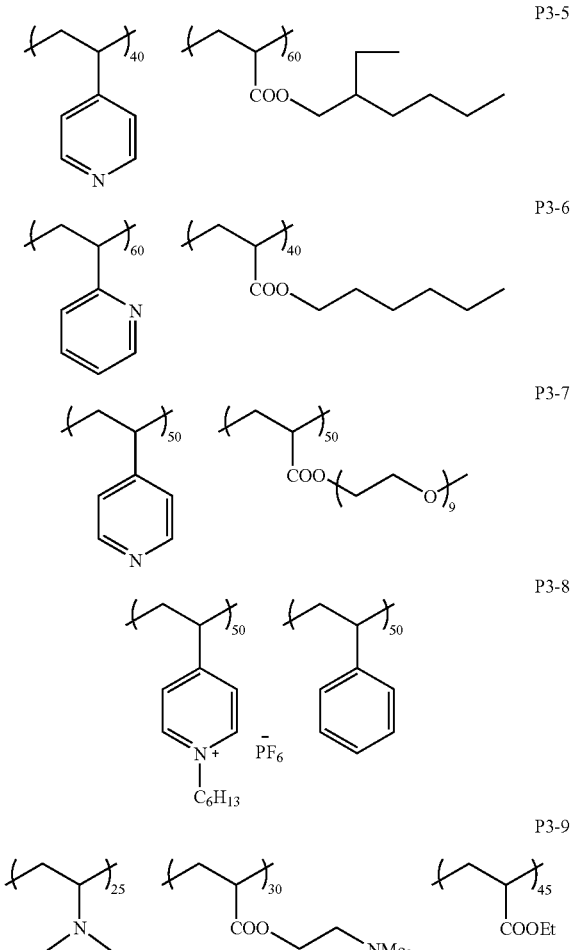
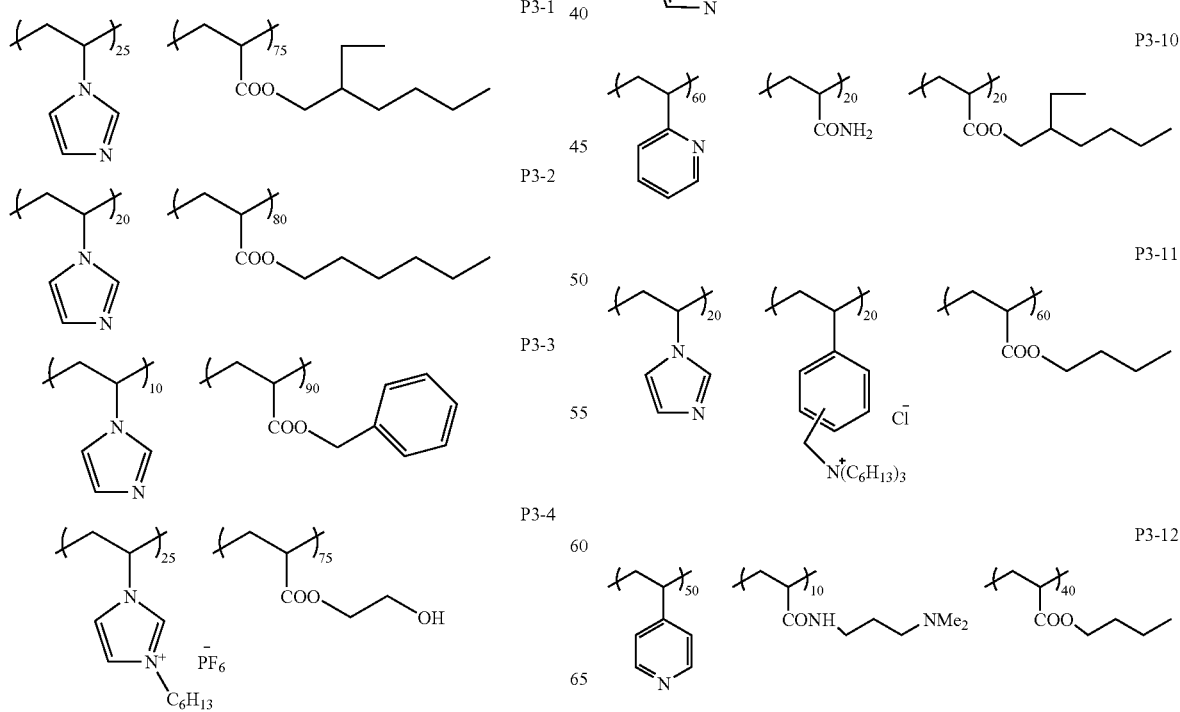

The following polymers can also be mentioned as preferable examples.

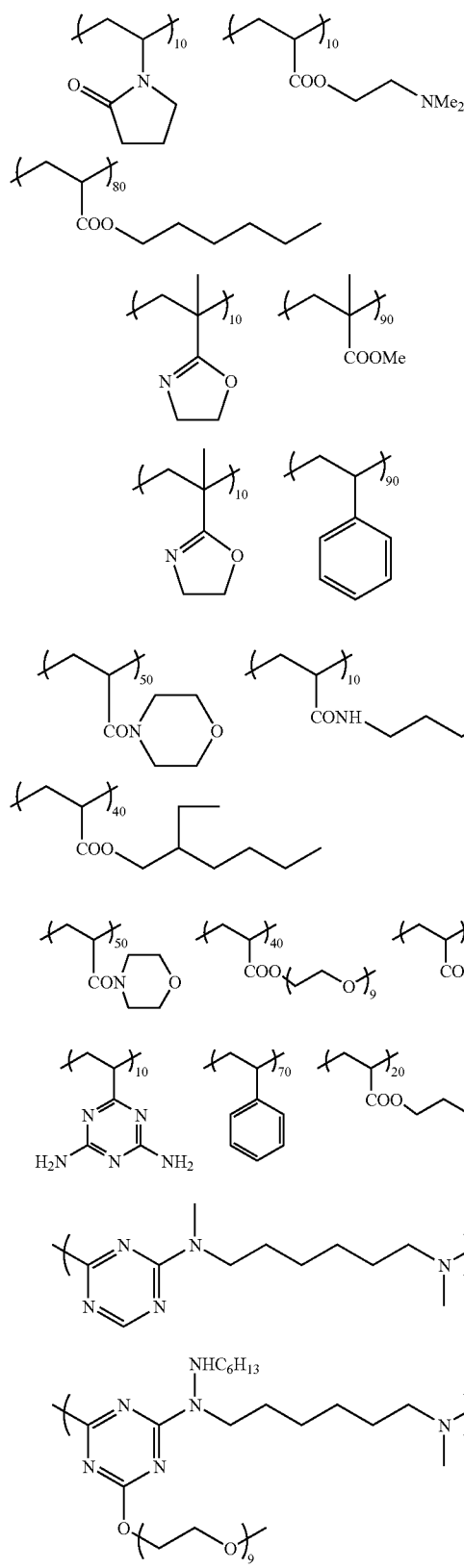

P3-13
P3-14
P3-15
P3-16
P3-17
P3-18
P3-19
P3-20

-continued

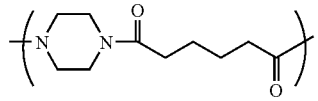

P3-21

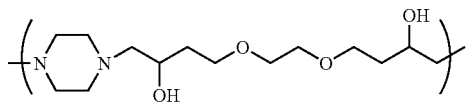

P3-22

(Polymer Having an Onium Group)

The polymer having an onium group may be a homopolymer consisting exclusively of a monomer having an onium group or a copolymer consisting of a monomer having an onium group and another monomer. In the constitution of the polymer having an onium group, the monomer having an onium group is preferably 10 mol % or more, more preferably 20 mol % or more.

The onium group includes an ammonium group, phosphonium group and sulfonium group, and is preferably an ammonium group. The polymer having an ammonium group can be obtained as a homopolymer of a monomer having a quaternary ammonium base or a copolymer of the monomer with another monomer or a condensation polymer thereof.

In the invention, the polymer having an ammonium group is particularly preferably a polymer having at least a unit represented by the following formula (1) or (2):

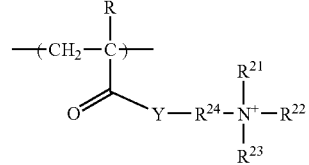

Formula (1)

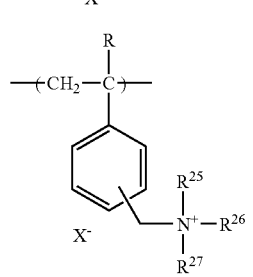

Formula (2)

wherein R represents a hydrogen atom or a methyl group, $R^{21}$ to $R^{23}$ and $R^{25}$ to $R^{27}$ independently represent an alkyl group, aralkyl group or aryl group; $R^{24}$ represents an alkylene group, aralkylene group or arylene group; Y represents O or NR', and R' represents a hydrogen atom or alkyl group; and X— represents a counter anion.

The alkyl group represented by the above-mentioned $R^{21}$ to $R^{23}$ and $R^{25}$ to $R^{27}$ is preferably a C18 or less, more preferably C16 or less, still more preferably C12 or less group. The alkyl group may be linear or cyclic or may have a substituent group. The substituent group includes an alkoxy group, aryloxy group, halogen atom, hydroxyl group, carbamoyl group, amino group etc.

Specific examples of the (substituted) alkyl group include a methyl group, ethyl group, n-propyl group, isopropyl group, n-butyl group, isobutyl group, t-butyl group, n-hexyl group, cyclohexyl group, 2-ethylhexyl group, n-octyl group, n-nonyl group, n-decyl group, n-dodecyl group, n-octadecyl group, hydroxyethyl group, 1-hydroxypropyl group, N,N-dimethylaminoethyl group, methoxyethyl group, chloroethyl group etc.

Among these alkyl groups, a methyl group, ethyl group, n-propyl group, isopropyl group, n-butyl group, isobutyl group, t-butyl group, n-hexyl group, cyclohexyl group, 2-ethylhexyl group, n-octyl group, n-nonyl group and n-decyl group are preferable, and a methyl group, ethyl group, n-propyl group, n-butyl group and n-hexyl group are particularly preferable.

The aryl group represented by the above-mentioned $R^{21}$ to $R^{23}$ and $R^{25}$ to $R^{27}$ is preferably a C18 or less, more preferably C16 or less, still more preferably C12 or less group. The aryl group may have a substituent group, and the substituent group includes an alkyl group, alkoxy group, aryloxy group, halogen atom, hydroxyl group, carbamoyl group, cyano group, amino group etc.

Specific examples of the (substituted) aryl group include a phenyl group, an alkylphenyl group (for example, a methylphenyl group, ethylphenyl group, n-propylphenyl group, n-butylphenyl group, cumenyl group, mesityl group, tolyl group, xylyl group etc.), a naphthyl group, chlorophenyl group, dichlorophenyl group, trichlorophenyl group, bromophenyl group, hydroxyphenyl group, methoxyphenyl group, acetoxyphenyl group, cyanophenyl group etc.

Among these (substituted) aryl groups, a phenyl group and naphthyl group are particularly preferable.

The aralkyl group represented by the above-mentioned $R^{21}$ to $R^{23}$ and $R^{25}$ to $R^{27}$ is preferably a C18 or less, more preferably C16 or less, still more preferably C12 or less group. The alkyl moiety of the aralkyl group can include the above-mentioned alkyl group. The aryl moiety of the aralkyl group can include the above-mentioned aryl group. The alkyl and/or aryl moiety of the aralkyl group may have a substituent group, and the substituent group is the same as illustrated for the alkyl group and aryl group.

Specific examples of the (substituted) aralkyl group include a benzyl group, phenylethyl group, vinylbenzyl group, hydroxyphenylmethyl group, diphenylmethyl group, trityl group, styryl group etc.

Among these (substituted) aralkyl groups, a benzyl group is particularly preferable.

Particularly preferably, $R^{21}$ to $R^{23}$ and $R^{25}$ to $R^{27}$ independently represent an alkyl group or aralkyl group, among which a methyl group, ethyl group, hexyl group and benzyl group are preferable.

$R^{24}$ represents a divalent linking group and is preferably an alkylene group, aralkylene group or arylene group.

The alkylene group represented by the above-mentioned $R^{24}$ is preferably a C8 or less, more preferably C6 or less, still more preferably C4 or less group. The alkylene group may be linear or cyclic or may have a substituent group, and the substituent group includes an alkoxy group, aryloxy group, halogen atom, hydroxyl group, carbamoyl group, amino group etc.

Specific examples of the (substituted) alkylene group include a methylene group, ethylene group, propylene group, trimethylene group, tetramethylene group, hexamethylene group, octamethylene group, 2-hydroxyethylene group, 2-hydroxypropylene group, 2-methoxypropylene group etc.

Among these (substituted) alkylene groups, a methylene group, ethylene group, propylene group, trimethylene group and 2-hydroxypropylene group are particularly preferable.

The arylene group represented by the above-mentioned $R^{24}$ is preferably a C12 or less, more preferably C10 or less, still more preferably C8 or less group. The arylene group may have a substituent group, and the substituent group is the same as the substituent group illustrated above for the aryl group.

Specific examples of the (substituted) arylene group include a phenylene group, an alkylphenylene group (for example, a 2-ethyl-1,4-phenylene group, 2-propyl-1,4-phenylene group etc.), a 2-chloro-1,4-phenylene group, an alkoxyphenylene group (for example, a 2-methoxy-1,4-phenylene group etc.), among which a phenylene group is particularly preferable.

The aralkylene group represented by the above-mentioned $R^{24}$ is preferably a C12 or less, more preferably C10 or less, still more preferably C8 or less group. The alkyl moiety of the aralkylene group can include the above-mentioned alkyl group, and the aryl moiety of the aralkylene group can include the above-mentioned aryl group. The aralkylene group may have a substituent group, and the substituent group is the same as the substituent group illustrated above for the alkyl group and aryl group.

Specific examples of the (substituted) aralkylene group include a xylylene group, benzylidene group etc., and a benzylidene group is particularly preferable.

$R^{24}$ is particularly preferably an alkylene group, among which an ethylene group or propylene group is preferable.

The alkyl group represented by the above-mentioned R' is preferably the same as the alkyl group represented by the above-mentioned $R^{21}$ to $R^{23}$ and $R^{25}$ to $R^{27}$. Preferable examples thereof are also the same as described therein.

—Y— is particularly preferably —O— or —NH—.

$X^-$ is a counter anion, and includes a halogen atom ($Cl^-$, $Br^-$, $I^-$), a sulfonate ion, alkyl sulfonate ion, aryl sulfonate ion, alkyl carbonate ion, aryl carbonate ion, $PF_6^-$, $BF_4^-$, etc. Among these anions, $Cl^-$, $Br^-$, a toluene sulfonate ion, methane sulfonate ion, $PF_6^-$ and $BF_4^-$ are particularly preferable.

In the case of a polymer having the unit represented by the formula (1) or (2), the unit represented by the formula (1) or (2) is contained preferably in an amount of 10 to 100 mol %, more preferably 20 to 100 mol %, in the polymer.

Preferable examples of a polymer having the unit represented by the formula (1) or (2) include the following polymers:

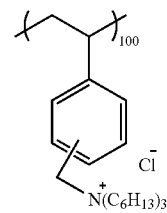

P2-1

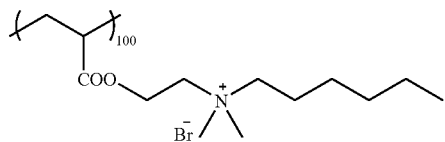

P2-2

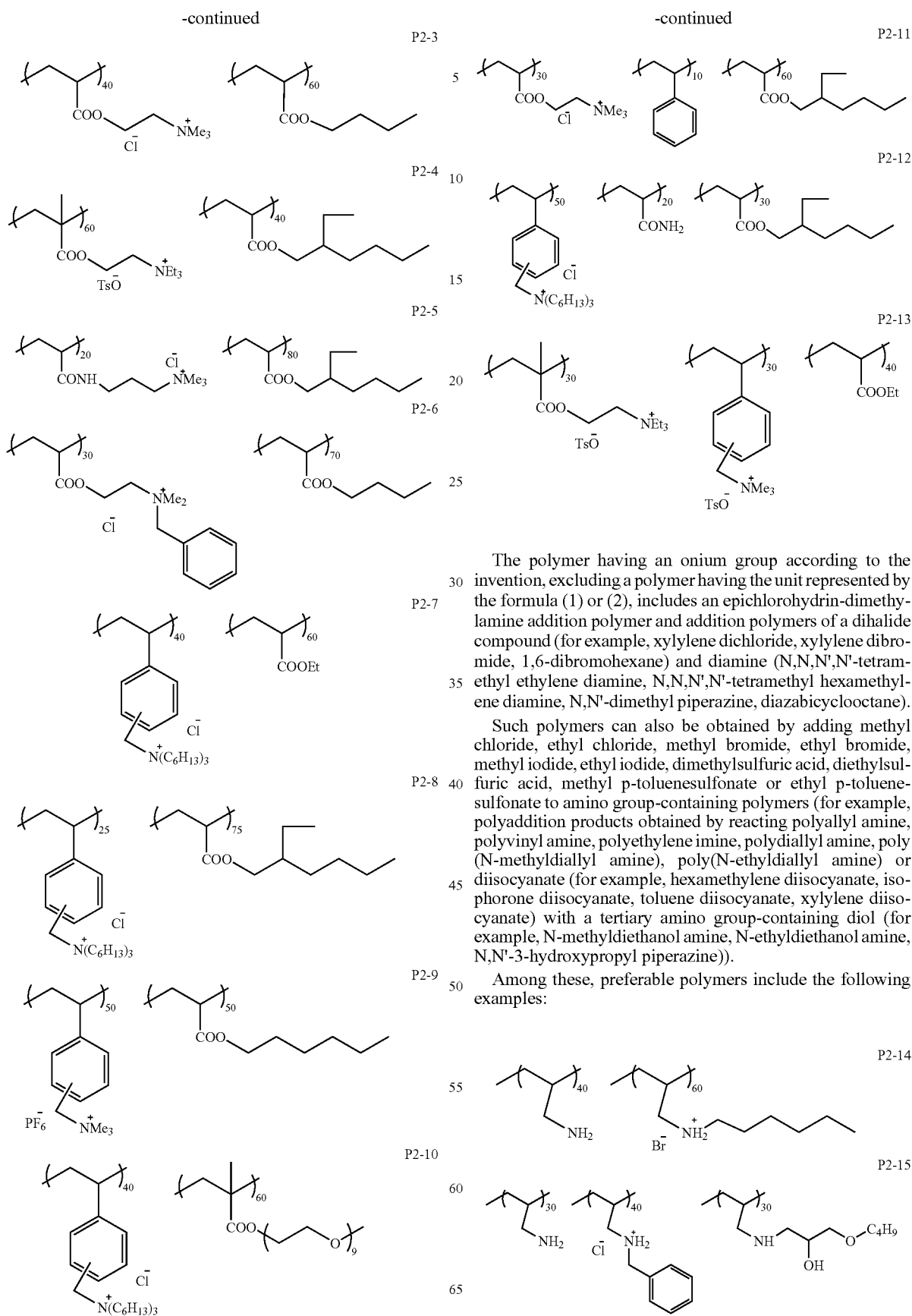

The polymer having an onium group according to the invention, excluding a polymer having the unit represented by the formula (1) or (2), includes an epichlorohydrin-dimethylamine addition polymer and addition polymers of a dihalide compound (for example, xylylene dichloride, xylylene dibromide, 1,6-dibromohexane) and diamine (N,N,N',N'-tetramethyl ethylene diamine, N,N,N',N'-tetramethyl hexamethylene diamine, N,N'-dimethyl piperazine, diazabicyclooctane).

Such polymers can also be obtained by adding methyl chloride, ethyl chloride, methyl bromide, ethyl bromide, methyl iodide, ethyl iodide, dimethylsulfuric acid, diethylsulfuric acid, methyl p-toluenesulfonate or ethyl p-toluenesulfonate to amino group-containing polymers (for example, polyaddition products obtained by reacting polyallyl amine, polyvinyl amine, polyethylene imine, polydiallyl amine, poly(N-methyldiallyl amine), poly(N-ethyldiallyl amine) or diisocyanate (for example, hexamethylene diisocyanate, isophorone diisocyanate, toluene diisocyanate, xylylene diisocyanate) with a tertiary amino group-containing diol (for example, N-methyldiethanol amine, N-ethyldiethanol amine, N,N'-3-hydroxypropyl piperazine)).

Among these, preferable polymers include the following examples:

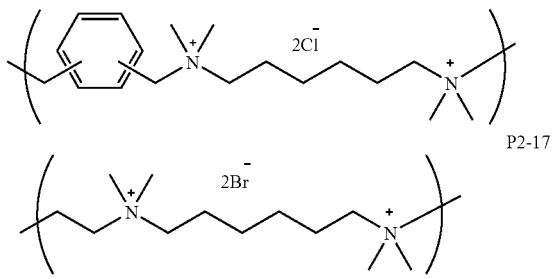

A polymer having the unit represented by the formula (1) or (2) can be obtained as a homopolymer of the following monomer having an ammonium group or as a copolymer containing said monomer.

The monomer having an ammonium group includes, for example, trimethyl-p-vinylbenzyl ammonium chloride, trimethyl-m-vinylbenzyl ammonium chloride, triethyl-p-vinylbenzyl ammonium chloride, triethyl-m-vinylbenzyl ammonium chloride, N,N-dimethyl-N-ethyl-N-p-vinylbenzyl ammonium chloride, N,N-diethyl-N-methyl-N-p-vinylbenzyl ammonium chloride, N,N-dimethyl-N-n-propyl-N-p-vinylbenzyl ammonium chloride, N,N-dimethyl-N-n-octyl-N-p-vinylbenzyl ammonium chloride, N,N-dimethyl-N-benzyl-N-p-vinylbenzyl ammonium chloride, N,N-diethyl-N-benzyl-N-p-vinylbenzyl ammonium chloride, N,N-dimethyl-N-(4-methyl)benzyl-N-p-vinylbenzyl ammonium chloride, N,N-dimethyl-N-phenyl-N-p-vinylbenzyl ammonium chloride, trimethyl-p-vinylbenzyl ammonium bromide, trimethyl-m-vinylbenzyl ammonium bromide, trimethyl-p-vinylbenzyl ammonium sulfonate, trimethyl-m-vinylbenzyl ammonium sulfonate, trimethyl-p-vinylbenzyl ammonium acetate, trimethyl-m-vinylbenzyl ammonium acetate, N,N,N-triethyl-N-2-(4-vinylphenyl)ethyl ammonium chloride, N,N,N-triethyl-N-2-(3-vinylphenyl)ethyl ammonium chloride, N,N-diethyl-N-methyl-N-2-(4-vinylphenyl)ethyl ammonium chloride, N,N-diethyl-N-methyl-N-2-(4-vinylphenyl)ethyl ammonium acetate, trimethyl-2-(methacryloyloxy)ethyl ammonium chloride, triethyl-2-(methacryloyloxy)ethyl ammonium chloride, trimethyl-2-(acryloyloxy)ethyl ammonium chloride, triethyl-2-(acryloyloxy)ethyl ammonium chloride, trimethyl-3-(methacryloyloxy)propyl ammonium chloride, triethyl-3-(methacryloyloxy)propyl ammonium chloride, trimethyl-2-(methacryloylamino)ethyl ammonium chloride, triethyl-2-(methacryloylamino)ethyl ammonium chloride, trimethyl-2-(acryloylamino)ethyl ammonium chloride, triethyl-2-(acryloylamino)ethyl ammonium chloride, trimethyl-3-(methacryloylamino)propyl ammonium chloride, triethyl-3-(methacryloylamino)propyl ammonium chloride, trimethyl-3-(acryloylamino)propyl ammonium chloride, triethyl-3-(acryloylamino)propyl ammonium chloride, N,N-dimethyl-N-ethyl-2-(methacryloyloxy)ethyl ammonium chloride, N,N-diethyl-N-methyl-2-(methacryloyloxy)ethyl ammonium chloride, N,N-dimethyl-N-ethyl-3-(acryloyloxylamino)propyl ammonium chloride, trimethyl-2-(methacryloyloxy)ethyl ammonium bromide, trimethyl-3-(acryloylamino)propyl ammonium bromide, trimethyl-2-(methacryloyloxy)ethyl ammonium sulfonate, trimethyl-3-(acryloylamino)propyl ammonium acetate, monomethyl diallyl ammonium chloride, dimethyl diallyl ammonium chloride, allylamine hydrochloride etc.

The monomer copolymerizable with these monomers includes, for example, alkyl (meth)acrylates [for example, (C1 to C18) alkyl (meth)acrylates such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate and stearyl (meth)acrylate], cycloalkyl (meth)acrylates [cyclohexyl (meth)acrylate etc.], aryl (meth)acrylates [phenyl (meth)acrylate etc.], aralkyl (meth)acrylates [benzyl (meth)acrylate etc.], substituted alkyl (meth)acrylates [for example, 2-hydroxyethyl (meth)acrylate etc.], (meth)acrylamides [for example, (meth)acrylamide, dimethyl (meth)acrylamide etc.], aromatic vinyls [styrene, vinyl toluene, α-methyl styrene etc.], vinyl esters [vinyl acetate, vinyl propionate, vinyl varsate etc.], allyl esters [allyl acetate etc.], halogen-containing monomers [vinylidene chloride, vinyl chloride etc.], vinyl cyanides [(meth)acrylonitrile etc.] and olefins [ethylene, propylene etc.].

Among these copolymerizable monomers, alkyl (meth)acrylates, (meth)acrylamides and aromatic vinyls are preferable, among which methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, 2-hydroxyethyl (meth)acrylate and styrene are particularly preferable.

These polymers can be synthesized by radical (co)polymerization of the monomers. As radical polymerization, a known method such as bulk polymerization, solution polymerization or emulsion polymerization can be used. If necessary, a polymerization initiation catalyst known to those skilled in the art can be used.

(Polymer Having an Amino Group)

The polymer having an amino group may be a homopolymer consisting exclusively of a monomer having an amino group or a copolymer consisting of a monomer having an amino group and another monomer. In the polymer having an amino group, the monomer having an amino group is preferably 10 to 100 mol %, more preferably 20 to 100 mol %.

The monomer having an amino group includes N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoethyl (meth)acrylamide, N,N-diethylaminoethyl (meth)acrylamide, N,N-dimethylaminopropyl (meth)acrylamide, N,N-diethylaminopropyl (meth)acrylamide, diallyl amine, N-methyldiallyl amine, N-vinylbenzyl-N,N-dimethyl amine, N-vinylbenzyl-N,N-diethyl amine, N-vinylbenzyl-N-ethyl-N-methyl amine, N-vinylbenzyl-N,N-dihexyl amine, N-vinylbenzyl-N-octadecyl-N-methyl amine, N-vinylbenzyl-N'-methyl-piperazine, N-vinylbenzyl-N'-(2-hydroxyethyl)-piperazine, N-benzyl-N-methylaminoethyl (meth)acrylate, N,N-dibenzylaminoethyl (meth)acrylate etc.

Particularly preferable among these compounds are N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoethyl (meth)acrylamide, N,N-diethylaminoethyl (meth)acrylamide, N,N-dimethylaminopropyl (meth)acrylamide and N,N-diethylaminopropyl (meth)acrylamide, among which N,N-dimethylaminoethyl (meth)acrylate, N,N-diethylaminoethyl (meth)acrylate and N,N-dimethylaminopropyl (meth)acrylamide are particularly preferable.

The monomer copolymerizable with these monomers includes, for example, alkyl (meth)acrylates [for example, alkyl (meth)acrylates whose alkyl moiety contains 1 to 18 carbon atoms, such as methyl (meth)acrylate, ethyl (meth) acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate and stearyl (meth)acrylate], cycloalkyl (meth)acrylates [cyclohexyl (meth)acrylate etc.], aryl (meth)acrylates [phenyl (meth)acrylate etc.], aralkyl (meth)acrylates [benzyl (meth) acrylate etc.], substituted alkyl (meth)acrylates [for example, 2-hydroxyethyl (meth)acrylate etc.], (meth)acrylamides [for example, (meth)acrylamide, dimethyl (meth)acrylamide etc.], aromatic vinyls [styrene, vinyl toluene, α-methyl styrene etc.], vinyl esters [vinyl acetate, vinyl propionate, vinyl varsate etc.], allyl esters [allyl acetate etc.], halogen-containing monomers [vinylidene chloride, vinyl chloride etc.], vinyl cyanides [(meth)acrylonitrile etc.] and olefins [ethylene, propylene etc.].

Among these copolymerizable monomers, alkyl (meth) acrylates having a C1 to C8 alkyl group, benzyl (meth)acrylate, and styrene are preferable, and ethyl (meth)acrylate, propyl (meth)acrylate, n-butyl (meth)acrylate, n-hexyl (meth)acrylate, and 2-ethylhexyl (meth)acrylate are particularly preferable.

Other examples of the polymer having an amino group include polyallyl amine, polyvinyl amine, polyethylene imine, polydiallyl amine, poly(N-methyldiallyl amine), poly (N-ethyldiallyl amine) and modified products thereof (benzyl chloride adduct of polyallyl amine, phenyl glycidyl ether adduct, acrylonitrile adduct), and polyaddition products of diisocyanate (for example, hexamethylene diisocyanate, isophorone diisocyanate, toluene diisocyanate, xylylene diisocyanate) and diol having a tertiary amino group (for example, N-methyl diethanol amine, N-ethyl diethanol amine, N,N'-3-hydroxypropyl piperazine).

Among these polymers, polyallyl amine, polyvinyl amine, polyethylene imine and modified products thereof are more preferable, and especially a modified product of polyallyl amine is particularly preferable.

In the invention, the polymer having an amino group is particularly preferably a polymer having a unit represented by following formula (3):

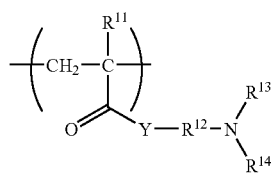

Formula (3)

In the formula (3), $R^{11}$ represents a hydrogen atom or a methyl group, Y represents O or $NR^{15}$, $R^{15}$ represents a hydrogen atom or an alkyl group, $R^{12}$ represents a divalent linking group, $R^{13}$ and $R^{14}$ independently represent an alkyl group, aralkyl group or aryl group.

The above-mentioned $R^{11}$ is more preferably a hydrogen atom, Y is more preferably O or NH, still more preferably O, and each of $R^{13}$ and $R^{14}$ is more preferably an alkyl or aralkyl group, still more preferably an alkyl group.

The divalent linking group represented by the above-mentioned $R^{12}$ is preferably an alkylene or arylene group, more preferably an alkylene group.

Specific examples of the divalent linking group include a methylene group, ethylene group, propylene group, trimethylene group, tetramethylene group, hexamethylene group, octamethylene group, phenylene group, 2-hydroxypropylene group etc., among which an ethylene group, propylene group and trimethylene group are particularly preferable.

The alkyl group represented by the above-mentioned $R^{13}$, $R^{14}$ and $R^{15}$ is preferably a C18 or less alkyl group, more preferably a C12 or less alkyl group, still more preferably a C8 or less alkyl group. The alkyl group may be linear or cyclic or may have a substituent group, and the substituent group includes a hydroxy group, an alkoxy group (for example, a methoxy group, ethoxy group, propoxy group etc.), an aryloxy group (for example, a phenoxy group etc.), an amino group, carbamoyl group, halogen atom etc.

Specific examples of the (substituted) alkyl group include a methyl group, ethyl group, n-propyl group, isopropyl group, n-butyl group, isobutyl group, t-butyl group, n-hexyl group, cyclohexyl group, 2-ethylhexyl group, n-octyl group, n-nonyl group, n-decyl group, n-dodecyl group, n-octadecyl group, hydroxyethyl group, 1-hydroxypropyl group, N,N-dimethylaminoethyl group, methoxyethyl group, chloroethyl group etc. Among these groups, a methyl group, ethyl group, n-propyl group, isopropyl group, n-butyl group, isobutyl group, t-butyl group, n-hexyl group, cyclohexyl group, 2-ethylhexyl group, n-octyl group, n-nonyl group and n-decyl group are more preferable, and a methyl group, ethyl group, n-propyl group, n-butyl group and n-hexyl group are particularly preferable.

The aryl group represented by the above-mentioned $R^{13}$ and $R^{14}$ is preferably a C18 or less aryl group, more preferably a C16 or less aryl group, still more preferably a C12 or less aryl group. The aryl group may have a substituent group.

Specific examples of the (substituted) aryl group include a phenyl group, an alkylphenyl group (for example, a methylphenyl group, ethylphenyl group, n-propylphenyl group, n-butylphenyl group, cumenyl group, mesityl group, tolyl group, xylyl group etc.), a naphthyl group, chlorophenyl group, dichlorophenyl group, trichlorophenyl group, bromophenyl group, hydroxyphenyl group, methoxyphenyl group, acetoxyphenyl group, cyanophenyl group etc. Among these groups, a phenyl group and naphthyl group are particularly preferable.

The aralkyl group represented by the above-mentioned $R^{13}$ and $R^{14}$ is preferably a C18 or less aralkyl group, more preferably a C16 or less aralkyl group, still more preferably a C12 or less aralkyl group. The alkyl moiety of the aralkyl group can include the above-mentioned alkyl group, and the aryl moiety of the aralkyl group can include the above-mentioned aryl group. The aralkyl group may have a substituent group.

Specific examples of the (substituted) aralkyl group include a benzyl group, phenylethyl group, vinylbenzyl group, hydroxyphenylmethyl group, diphenylmethyl group, trityl group, styryl group etc., among which a benzyl group is particularly preferable.

Preferable examples of a polymer having the unit represented by the formula (3) include the following polymers:

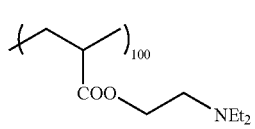

P1-1

-continued
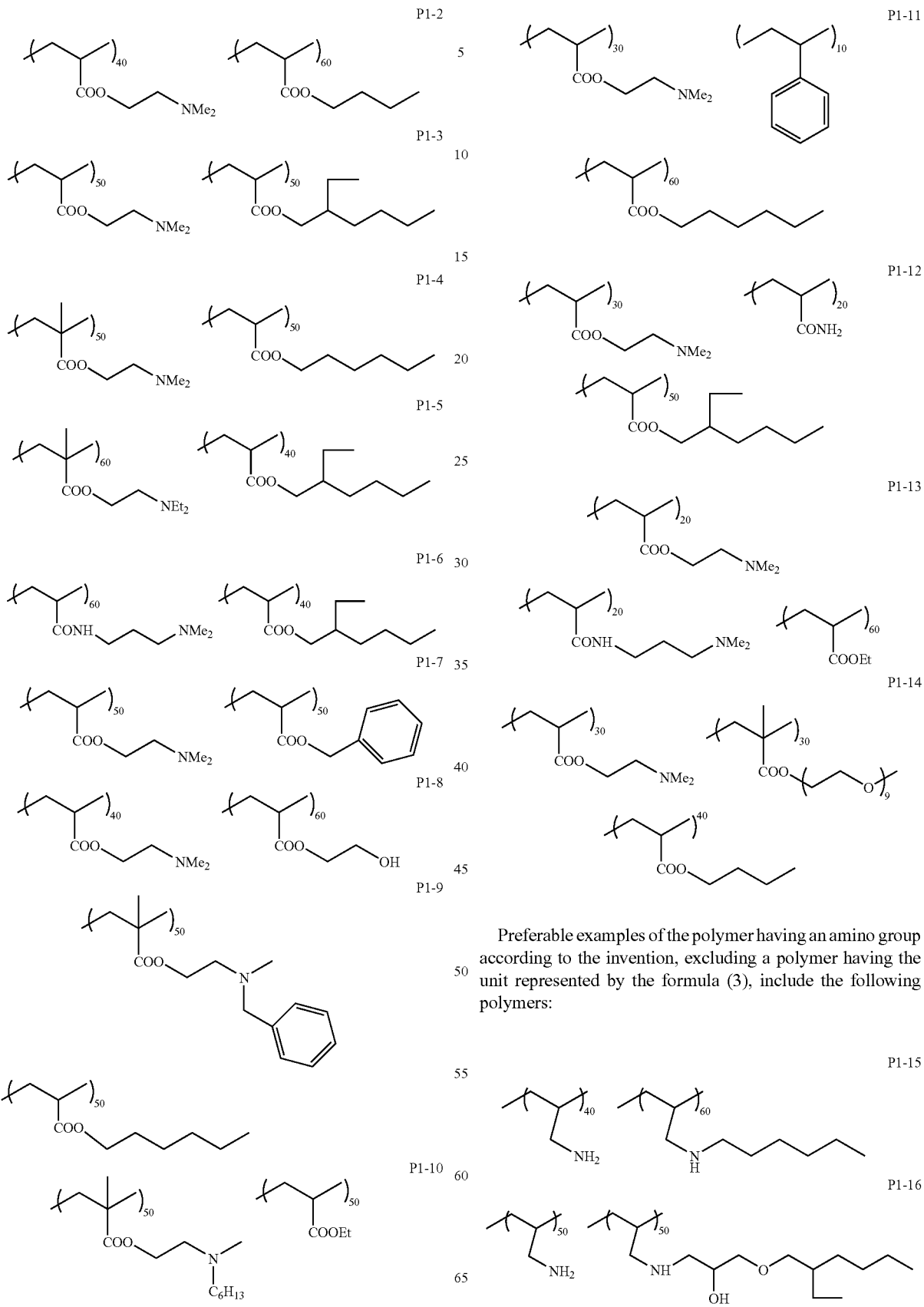
Preferable examples of the polymer having an amino group according to the invention, excluding a polymer having the unit represented by the formula (3), include the following polymers:
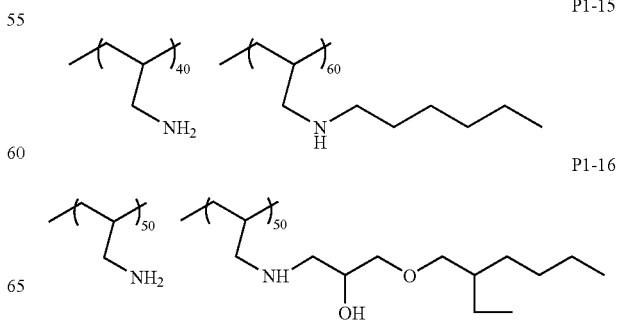

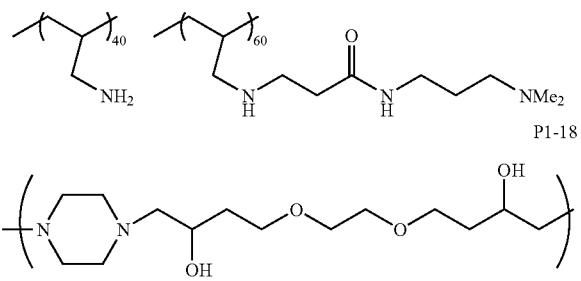

P1-17

P1-18

A polymer having the unit represented by formula (3) can be synthesized by radical (co)polymerization, and as the radical (co)polymerization, known methods such as bulk polymerization, solution polymerization and emulsion polymerization can be used. However, the method is not limited to these polymerization methods, and other known methods can also be used.

[Colorant]

Among a plurality of liquids including the first and second liquids in the invention, every liquid may be colorless ink not containing a colorant, or at least one of the liquids may contain a colorant.

In the first liquid containing an oil-soluble polymer, the content of a colorant is preferably 1 mass % or less, more preferably 0.5 mass % or less, still more preferably 0.1 mass % or less, and further more preferably the first liquid does substantially not contain a colorant, as described above. The phrase "does substantially not contain" is not intended to exclude cases where a colorless transparent dye or pigment is contained or a colorant in a too small amount to be recognizable is contained.

On the other hand, the second liquid may or may not contain a colorant, but preferably contains a colorant. When the colorant is contained in the second liquid while the oil-soluble polymer is contained in the first liquid, the colorant and the oil-soluble polymer are contained in the different liquids, which is preferable for particularly exhibiting the color segregation-preventing effect as one effect of the invention.

The colorant can also be contained in a liquid other than the first and second liquids. However, if a liquid other than the first and second liquids contains the colorant, this liquid preferably does not contain the oil-soluble polymer, as described above.

The colorant used in the invention is not particularly limited, and can be selected suitably from known water-insoluble dyes, oil-soluble dyes and pigments that can achieve hues and color density adapted to the intended use of the ink. In particular, the liquids themselves including the first and second liquids constituting the ink set for ink jet recording according to the invention are preferably water-insoluble liquids, as described above, and it is preferable from the viewpoint of rapid drying and the stability of discharged ink droplets that even if a solvent is used, an aqueous solvent is not contained, and from this viewpoint, it is preferable to use an oil-soluble dye or pigment easily uniformly dispersed and dissolved in a water-insoluble liquid, and from the viewpoint of particularly excellent image qualities as the effect of the invention and excellent weatherability, it is preferable to use a pigment.

(Oil-Soluble Dye)

The oil-soluble dye usable in the invention is not particularly limited, and an arbitrary oil-soluble dye can be used. Hereinafter, the oil-soluble dyes usable in the invention are illustrated for each hue.

The yellow dye includes, for example, aryl or heteryl azo dyes having phenols, naphthols, anilines, pyrazolones, pyridones, or closed active methylene compounds as the coupling component; azomethine dyes having closed active methylene compounds as the coupling component; methine dyes such as benzylidene dye and monomethine oxonol dye; quinone dyes such as naphthoquinone dye and anthraquinone dye, and other dyes include quinophthalone dyes, nitro/nitroso dyes, acridine dyes, acridinone dyes etc.

The magenta dye includes, for example, aryl or heteryl azo dyes having phenols, naphthols or anilines as the coupling component; azomethine dyes having pyrazolones or pyrazolotriazoles as the coupling component; methine dyes such as arylidene dye, styryl dye, merocyanine dye and oxonol dye; carbonium dyes such as diphenylmethane dye, triphenylmethane dye and xanthene dye; quinone dyes such as naphthoquinone, anthraquinone and anthrapyridone; and condensed polycyclic dyes such as dioxazine dye.

The cyan dye includes, for example, indoaniline dyes and indophenol dyes, or azomethine dyes having pyrrolotriazoles as the coupling component; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl or heteryl azo dyes having phenols, naphthols or anilines as the coupling component; and indigo/thioindigo dyes.

These dyes may be those showing each color of yellow, magenta and cyan upon dissociation of a part of their chromophore, and the counter cation in this case may be an inorganic cation such as alkali metal or ammonium, an organic cation such as pyridinium and quaternary ammonium salt, or a cation polymer having a partial structure thereof.

When the oil-soluble dye is used as a colorant, the content of the dye in the second liquid is preferably in the range of 0.05 to 20 mass %, more preferably 0.1 to 15 mass %, still more preferably 0.2 to 6 mass %, in terms of solids content. When the dye is contained in a liquid other than the first and second liquids, the content of the dye therein is preferably in the range of 0 to 1 mass % in terms of solids content.

(Pigment)

A mode of using a pigment as the colorant is also preferable from the viewpoint of easy flocculation upon mixing of a plurality of liquids.

As the pigment used in the invention, both organic and inorganic pigments can be used, and preferable examples of black pigment include carbon black pigment etc. Generally, pigments of black and three primary colors (cyan, magenta and yellow) are used, but pigments of other hues, for example pigments having hues such as red, green, blue, brown and white, and metallic glossy pigments of silver, gold etc., or colorless or light-colored extender pigments can also be used depending on the object.

Particles having a dye or a pigment fixed on the surfaces of particles of silica, alumina or resin as core material, insoluble dye lake, colored emulsion, and colored latex can also be used as the pigment.

Further, resin-coated pigments can also be used. These are called microcapsule pigment and commercially available from Dainippon Ink and Chemicals, Incorporated, TOYO INK MFG. Co., Ltd., etc.

From the viewpoint of balance between optical density and storage stability, the volume-average particle diameter of the pigment particles contained in the liquid in the invention is preferably in the range of 30 to 250 nm, more preferably 50 to 200 nm. The volume-average particle diameter of the pigment particles can be measured by for example a measuring instrument such as LB-500 (manufactured by Horiba, Ltd.).

When a pigment is used as the colorant, the content of the pigment in the second liquid is preferably in the range of 0.1 to 20 mass %, more preferably in the range of 1 to 10 mass %, in terms of solids content, from the viewpoint of optical density and jet stability. When a pigment is used in a liquid other than the first and second liquids, the content of the pigment in the liquid is preferably in the range of 0 to 1 mass % in terms of solids content.

The colorants may be used alone or as a mixture of two or more thereof. The colorant used in the respective liquids may be the same or different.

[Polymerizable Compound]

In the invention, at least one liquid of a plurality of liquids including the first and second liquids contains a polymerizable compound. It is preferable that the polymerizable compound is contained in the second liquid, but it is also preferable that the polymerizable compound is contained in both the first and second liquids in order to improve the compatibility between the two liquids. It is estimated that in one preferable mode, the colorant is contained in the second liquid, whereby the compatibility between the two liquids is improved thereby effectively capturing the colorant contained in the second liquid.

The polymerizable compound has a function of being cured through polymerization reaction caused by an initiating species such as a radical generated from a polymerization initiator described later. Such polymerizable compound is contained in any one of the liquids and can be solidified by polymerization with energy such as light or heat to fix an image formed.

As the polymerizable compound, use can be made of a polymerizable compound whose radical polymerization reaction, cation polymerization reaction, dimerization reaction etc. are known. The polymerizable compound includes an addition-polymerizable compound containing at least one ethylenically unsaturated double bond, an epoxy compound, an oxetane compound, an oxirane compound, a polymer compound having a maleimide group in a side chain, and a polymer compound having, in a side chain, a cinnamyl group, cinnamylidene group or chalcone group having an unsaturated double bond capable of photo-dimerization adjacent to an aromatic nucleus, and the polymerizable compound is more preferably an addition-polymerizable compound having at least one ethylenically unsaturated double bond, particularly preferably a compound selected from compounds (monofunctional or multifunctional compounds) each having at least one, more preferably two or more, terminal unsaturated ethylenically unsaturated doubles. Specifically, the polymerizable compound can be selected suitably from polymerizable compounds widely known in the industrial field of the invention, including those in a chemical form such as a monomer, a prepolymer, that is, a dimer, a trimer and an oligomer, or a mixture thereof, or a copolymer thereof.

The polymerizable compound preferably has a polymerizable group such as an acryloyl group, methacryloyl group, allyl group, vinyl group or internal double bonding group (maleic acid etc.) in its molecule, among which the compound having an acryloyl group or methacryloyl group is preferable because its curing reaction can be caused with low energy.

The multifunctional polymerizable compound that can be used in the invention includes a vinyl group-containing aromatic compound, (meth)acrylate that is an ester of divalent or more alcohol and (meth)acrylic acid, (meth)acrylamide that is an amide of divalent or more amine and (meth)acrylic acid, polyester (meth)acrylate having (meth)acrylic acid introduced into polycaprolactone or an ester obtained by linking polybasic acid with divalent alcohol, polyether (meth)acrylate having (meth)acrylic acid introduced into an ether obtained by linking alkylene oxide with polyvalent alcohol, epoxy(meth)acrylate obtained by introducing (meth)acrylic acid into epoxy resin or by reacting divalent or more alcohol with an epoxy-containing monomer, urethane acrylate having an urethane linkage, amino resin acrylate, acryl resin acrylate, alkyd resin acrylate, spiran resin acrylate, silicone resin acrylate, a reaction product of unsaturated polyester and the photopolymerizable monomer, and a reaction product of wax and the polymerizable monomer, among which (meth)acrylate, polyester (meth)acrylate, polyether (meth)acrylate, epoxy acrylate, urethane acrylate, acryl resin acrylate, silicone resin acrylate, and a reaction product of unsaturated polyester and the photopolymerizable monomer are preferable, and acrylate, polyester acrylate, polyether acrylate, epoxy acrylate and urethane acrylate are particularly preferable.

In the specification, the term "(meth)acrylic acid" refers sometimes to acrylic acid and/or methacrylic acid.

Examples of the multifunctional polymerizable compound include, for example, divinyl benzene, 1,3-butanediol diacrylate, 1,6-hexanediol diacrylate, pentaerythritol triacrylate, trimethylol propane triacrylate, dipentaerythritol hexaacrylate, 1,6-acryloyl aminohexane, hydroxypivalate neopentylglycol diacrylate, polyester acrylate having a (meth)acryloyl group in the terminus of a molecular chain of a polyester having a molecular weight of 500 to 30,000 consisting of dibasic acid and divalent alcohol, polyethyleneglycol diacrylate, epoxy acrylate having a molecular weight of 450 to 30,000 containing a bisphenol (A, S or F) skeleton, epoxy acrylate having a molecular weight of 600 to 30,000 containing a phenol novolak resin skeleton, a reaction product having a molecular weight of 350 to 30,000 consisting of a multivalent isocyanate and a hydroxyl group-containing (meth)acrylate monomer, and a modified urethane product having an urethane linkage in its molecule.

The monofunctional polymerizable monomer usable in the invention includes (meth)acrylate, styrene, acrylamide, a vinyl group-containing monomer (vinyl esters, vinyl ethers, N-vinylamide etc.), and (meth)acrylic aid, among which (meth)acrylate, acrylamide, vinyl esters and vinyl ethers are preferable, and (meth)acrylate and acrylamide are particularly preferable. These polymerizable monomers may have substituent groups, and the substituent groups which can be introduced into the monomers include a halogen atom, a hydroxyl group, an amide group, a carboxylic acid group, etc.

Specific examples of the monofunctional polymerizable monomers include hydroxyethyl acrylate, glycidyl acrylate, tetrahydrofurfuryl acrylate, dicyclopentenyl acrylate, 2-acryloyloxyethyl phosphate, allyl acrylate, N,N-dimethylaminoethyl acrylate, N,N-dimethyl acrylamide, N,N-diethylaminopropyl acrylamide, N-butoxymethyl acrylamide, acryloyl morpholine, 2-hydroxyethyl vinyl ether, N-vinyl formamide, N-vinyl acetamide, 2-cyclohexyl carbamoyloxyethyl acrylate, an acrylate containing a polybutyl acrylate site in its ester, and an acrylate containing a polydimethyl siloxane site in its ester.

The polymerizable compounds may be used alone or as a mixture of two or more thereof. When the polymerizable compound is contained in a plurality of liquids, different kinds of polymerizable compounds may be used in the liquids respectively, or the same kind of polymerizable compound may be used in the liquids, and for excellent compatibility among the plural kinds of liquids, the same kind of polymerizable compound is preferably used.

When the polymerizable compound is contained in one or more of a plurality of liquids, the content of the polymerizable compound in one kind of liquid is preferably in the range of 50 to 99.6 mass %, more preferably in the range of 70 to 99.0 mass %, still more preferably in the range of 80 to 99.0 mass %, in terms of solids content. The content of the polymerizable compound in all the liquids is preferably in the range of 20 to 98 mass %, more preferably in the range of 40 to 95 mass %, still more preferably in the range of 50 to 90 mass %, in terms of solids content.

When the polymerizable compound is contained in both of the first and second liquids, the content of the polymerizable compound in the first liquid is preferably 1 to 1,000 parts by weight, more preferably 5 to 100 parts by weight, still more preferably 10 to 50 parts by weight, assuming the content of the polymerizable compound in the second liquid is 100 parts by weight.

[Polymerization Initiator]

As described above, a polymerization initiator for curing the polymerizable compound is preferably contained in at least one of a plurality of liquids (including the first and second liquids) used in the invention. From the viewpoint of the storage stability of the liquid, the polymerization initiator is contained preferably in the liquid not containing the polymerizable compound, and by applying activation energy to the two on a recording medium, the polymerization/curing reaction is caused.

When the polymerizable compound is contained in both of the first and second liquids, the polymerization initiator is contained preferably in a third liquid not containing the polymerizable compound. From the viewpoint of stability with time, the content of the polymerization initiator in the third liquid is preferably 0.5 to 20 mass %, more preferably 1 to 15 mass %, still more preferably 3 to 10 mass %. In the ink set for ink jet recording consisting of only the two liquids (first and second liquids), the polymerizable compound is contained in both the liquids, and from the viewpoint of stability with time, a polymerization initiator is contained preferably in the second liquid containing a colorant. It is estimated that the colorant acts as a filter to suppress curing with time.

The polymerization initiator used in the invention refers to a compound generating initiating species such as radicals by the energy of light and/or heat, to initiate and promote polymerization of the polymerizable compound. As the polymerization initiator in the invention, a known heat polymerization initiator, a compound whose bonding dissociation energy is low, a photopolymerization initiator etc. can be selected and used.

Such radical-generating compound includes an organic halogenated compound, a carbonyl compound, an organic peroxide compound, an azo polymerization initiator, an azide compound, a metallocene compound, a hexaaryl biimidazole compound, an organic boric acid compound, a disulfonic acid compound, an onium chloride, etc.

Preferable examples of the polymerization initiator in the invention include the following photopolymerization initiators. Examples include photopolymerization initiators such as an acetophenone derivative, benzophenone derivative, benzyl derivative, benzoin derivative, benzoin ether derivative, benzyl dialkyl ketal derivative, thioxanthone derivative, acyl phosphine oxide derivative, metal complex, p-dialkyl aminobenzoic acid, azo compound and peroxide compound, among which an acetophenone derivative, benzyl derivative, benzoin ether derivative, benzyl dialkyl ketal derivative, thioxanthone derivative and acyl phosphine oxide derivative are preferable, and an acetophenone derivative, benzoin ether derivative, benzyl dialkyl ketal derivative and acyl phosphine oxide derivative are particularly preferable.

Specific examples of such photopolymerization initiators include acetophenone, 2,2-diethoxyacetophenone, p-dimethylaminoacetophenone, p-dimethylaminopropiophenone, benzophenone, p,p'-dichlorobenzophenone, p,p'-bisdiethylaminobenzophenone, Michler's ketone, benzyl, benzoin, benzoin methyl ether, benzoin isopropyl ether, benzoin-n-propyl ether, benzoin isobutyl ether, benzyl dimethyl ketal, 1-hydroxy-cyclohexyl phenyl ketone, tetramethyl thiuram monosulfide, thioxanthone, 2-chlorothioxanthone, 2,4-dimethyl thioxanthone, 2,2-dimethyl propioyl, diphenyl phosphine oxide, 2-methyl-2-ethylhexanoyl diphenyl phosphine oxide, 2,6-dimethyl benzoyl diphenyl phosphine oxide, 2,6-dimethoxy benzoyl diphenyl phosphine oxide, 2,4,6-trimethyl benzoyl diphenyl phosphine oxide, bis(2,6-dimethoxybenzoyl)-2,4,4-trimethyl pentyl phosphine oxide, 2,3,6-trimethyl benzoyl-diphenyl phosphine oxide, bis(2,3,6-trimethylbenzoyl)-phenyl phosphine oxide, 2,4,6-trimethoxybenzoyl-diphenyl phosphine oxide, 2,4,6-trichlorobenzoyl diphenyl phosphine oxide, 2,4,6-trimethyl benzoyl naphthyl phosphonate, bis(η5-2,4-cyclopentadiene-1-yl)-bis(2,6-difluoro-3-(1H-pyrrol-1-yl)-phynyl) titanium, p-dimethylaminobenzoic acid, p-diethylaminobenzoic acid, azobisisobutyronitrile, 1,1'-azobis(1-acetoxy-1-phenylethane), benzoyl peroxide and di-tert-butyl peroxide.

Other preferable examples of the photopolymerization initiator include photopolymerization initiators described on pages 65 to 148 in "Shigaisen Koka System" (Ultraviolet Cure System) written by Kiyoshi Kato and published in 1989 by K.K. Sogo Gijutsu Center.

The polymerization initiator is preferably an initiator excellent in sensitivity, and for example, use of a polymerization initiator pyrolyzed at a temperature of 80° C. or less is not preferable from the viewpoint of storage stability, and a polymerization initiator not pyrolyzed at a temperature of up to 80° C. is preferably selected.

The polymerization initiators are used alone or as a mixture of two or more thereof. For the purpose of improving sensitivity, the polymerization initiator can also be used in combination with a known sensitizer insofar as the effect of the invention is not hindered.

[Ink Set]

In the invention, the ink set is not particularly limited insofar as the first liquid comprises an oil-soluble polymer (a) dissolved therein and at least one of a plurality of the liquids contains a polymerizable compound (c), and preferably the ink set makes use of a plurality of liquids containing at least the first liquid which does substantially not contain a colorant (b) and contains the oil-soluble polymer (a) and the second liquid which does substantially not contain the oil-soluble polymer (a) and contains the colorant (b), wherein at least one of a plurality of the liquids contains the polymerizable compound (c).

For example, the two-liquid-type ink set consisting of the first and second liquids includes:

(1) a combination wherein the oil-soluble polymer (a) and the polymerizable compound (c) are contained in the first liquid, and the colorant (b) is contained in the second liquid, (2) a combination wherein the oil-soluble polymer (a) is contained in the first liquid, and the colorant (b) and the polymerizable compound (c) are contained in the second liquid, and (3) a combination wherein the oil-soluble polymer (a) and the polymerizable compound (c) are contained in the first liquid, and the colorant (b) and the polymerizable compound (c) are contained in the second liquid.

In each of (1) to (3), it is preferable that a polymerization initiator is further contained in the first liquid and/or the second liquid, and in this case, it is preferable from the viewpoint of storage stability that the liquid not containing the polymerizable compound (c) is used in the mode (1) or (2).

When an ink set using 3 or more liquids such as a 3-liquid type ink set is used, the polymerization initiator may be contained in the first liquid and/or the second liquid, or the polymerization initiator may be contained not in the first liquid and/or the second liquid but in other liquid(s). Alternatively, the polymerization initiator may be contained not only in the first liquid and/or the second liquid but also in other liquid(s).

[Other Components]

In addition to the components described above, the following additives can be simultaneously used in a plurality of the liquids in the invention according to the object.

(Solvent)

In one or more of a plurality of liquids in the invention, a solvent can be used for the purpose of improvement of the polarity, viscosity and surface tension of the ink and the solubility and dispersibility of the colorant, regulation of electrical conductivity and regulation of printing performance. The solvent is preferably a water-insoluble liquid, and from the viewpoint of the stability of discharged ink droplets and rapid drying characteristics, the solvent is preferably a solvent that does substantially not contain an aqueous solvent.

Use of a high-boiling organic solvent described below in at least one liquid containing the oil-soluble polymer, such as the first liquid, is preferable. The high-boiling organic solvent can also be used in the liquid not containing the oil-soluble polymer.

As the solvent, a low-boiling organic solvent having a boiling point of 100° C. or less can also be mentioned, but is preferably not used due to concern about influence on curing properties and in consideration of environmental pollution with the low-boiling organic solvent. When used, a highly safe solvent is preferably used, and this highly safe solvent is a solvent whose controlled concentration (index indicated by evaluation criteria for working atmosphere) is high, preferably a solvent whose controlled concentration is 100 ppm or more, more preferably 200 ppm or more. Specifically, the solvent includes, for example, alcohols, ketones, esters, ethers and hydrocarbons, and specific examples include methanol, 2-butanol, acetone, methyl ethyl ketone, ethyl acetate, and tetrahydrofuran.

The solvents may be used alone or as a mixture of two or more thereof, and when water and/or the low-boiling organic solvent is used, the amount of the two used in each liquid is preferably 0 to 20 mass %, more preferably 0 to 10 mass %, and particularly preferably the solvent is substantially not contained. It is not preferable that water is contained in the liquid, because the system is made heterogeneous and the dye is precipitated to make the liquid turbid, thus causing a problem in stability with time, and when a recording medium not absorbing water is used, there is a problem in drying characteristics. The phrase "is substantially not contained" means that the presence of unavoidable impurities is allowable.

—High-Boiling Organic Solvent—

A high-boiling organic solvent can be contained in one or more of a plurality of liquids in the invention. The high-boiling organic solvent in the invention refers to (1) an organic solvent having a boiling point of 100° C. or more (condition (1)).

The boiling point in the condition (1) is preferably 150° C. or more, particularly preferably 170° C. or more. The melting point of the high-organic organic solvent is preferably 80° C. or less, more preferably 25° C. or less.

By allowing the high-boiling organic solvent to be contained in liquid(s), bleeding and interference between discharged droplets can be more effectively prevented.

A high-boiling organic solvent not satisfying the boiling point in the condition (1) may be evaporated during formation of images because of its too low boiling point, thus inhibiting the effect of the invention on prevention of interference between discharged droplets. This evaporation into the air is not preferable from an environmental point of view.

From the viewpoint of further prevention of bleeding and the interference between discharged droplets, the high-boiling organic solvent is contained preferably in a liquid containing the oil-soluble polymer, and contained more preferably in a liquid not containing the polymerizable compound.

The high-boiling organic solvent is preferably (2) an organic solvent having a viscosity of 100 mPa·s or less at 25° C. or a viscosity of 30 mPa·s or less at 60° C. (condition (2)). A high-boiling organic solvent not satisfying the viscosity in the condition (2) causes the liquid to have high viscosity, which is sometimes not preferable for application of the liquid onto a recording medium.

In the condition (2), the viscosity at 25° C. is more preferably 70 mPa·s or less, still more preferably 40 mPa·s or less, further more preferably 20 mPa·s or less. The viscosity at 60° C. is more preferably 20 mPa·s or less, still more preferably 10 mPa·s or less. The solubility of water in the high-boiling organic solvent (25° C.) is preferably 4 g or less. The solubility of water is more preferably 3 g or less, still more preferably 2 g or less, further more preferably 1 g or less.

The "viscosity" in the invention refers to viscosity determined by using an RE80 viscometer manufactured by TOKI SANGYO CO., LTD. The RE80 viscometer is a viscometer of cone rotor corresponding to E-type/flat board system, which was used in measurement at a revolution number of 10 rpm with a rotor (rotor code No. 1). For measurement of a sample having a high viscosity of 60 mPa·s or more, however, the revolution number was changed if necessary to 5 rpm, 2.5 rpm, 1 rpm, 0.5 rpm etc.

In the invention, the terms "solubility of water" refer to the saturation concentration of water in the high-boiling organic solvent at 25° C., and means the mass (g) of water that can be dissolved in 100 g of the high-boiling organic solvent at 25° C.

The amount of the high-boiling organic solvent added to the liquid is preferably in the range of 50 to 100 mass %, more preferably 70 to 100 mass %, still more preferably 90 to 100 mass %, relative to the total weight of the liquid.

In the ink set of the invention, the amount of the high-boiling organic solvent used is preferably 5 to 2,000 mass %, more preferably 10 to 1,000 mass %, relative to the colorant used.

In the invention, the high-boiling organic solvent is preferably a compound represented by any one of the following formulae [S-1] to [S-9]:

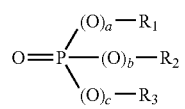
Formula [S-1]

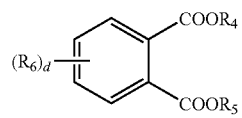
Formula [S-2]

Formula [S-3]

Formula [S-4]

Formula [S-5]

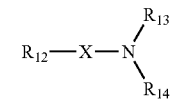
Formula [S-6]

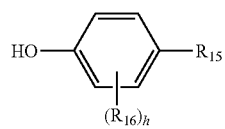
Formula [S-7]

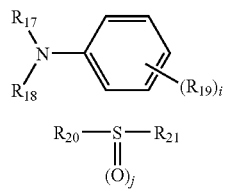
Formula [S-8]

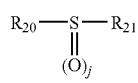
Formula [S-9]

In the formula [S-1], $R_1$, $R_2$ and $R_3$ independently represent an aliphatic group or an aryl group. a, b and c independently represent 0 or 1.

In the formula [S-2], $R_4$ and $R_5$ independently represent an aliphatic group or an aryl group, and $R_6$ represents a halogen atom (which refers hereinafter to F, Cl, Br and I), an alkyl group, alkoxy group, aryloxy group, alkoxycarbonyl group or aryloxycarbonyl group, and d represents an integer of 0 to 3; when d is two or more, a plurality of $R_6$s may be the same or different.

In the formula [S-3], Ar represents an aryl group, e represents an integer of 1 to 6, and $R_7$ represents an e-valent hydrocarbon group or hydrocarbon groups bound to each other via an ether linkage.

In the formula [S-4], $R_8$ represents an aliphatic group, f represents an integer of 1 to 6, and $R_9$ represents an f-valent hydrocarbon group or hydrocarbon groups bound to each other via an ether linkage.

In the formula [S-5], g represents an integer of 2 to 6, $R_{10}$ represents a g-valent hydrocarbon group excluding an aryl group, and $R_{11}$ represents an aliphatic group or an aryl group.

In the formula [S-6], $R_{12}$, $R_{13}$ and $R_{14}$ independently represent a hydrogen atom, an aliphatic group or an aryl group. X represents —CO— or —$SO_2$—. $R_{12}$ and $R_{13}$, or $R_{13}$ and $R_{14}$, may be bound to each other to form a ring.

In the formula [S-7], $R_{15}$ represents an aliphatic group, alkoxycarbonyl group, aryloxycarbonyl group, alkylsulfonyl group, arylsulfonyl group, aryl group or cyano group, $R_{16}$ represents a halogen atom, aliphatic group, aryl group, alkoxy group or aryloxy group, h represents an integer of 0 to 3; when h is two or more, a plurality of $R_{16}$s may be the same or different.

In the formula [S-8], $R_{17}$ and $R_{18}$ independently represent an aliphatic group or aryl group, $R_{19}$ represents a halogen atom, aliphatic group, aryl group, alkoxy group or aryloxy group, and i represents an integer of 0 to 5; when i is two or more, a plurality of $R_{19}$s may be the same or different.

In the formula [S-9], $R_{20}$ and $R_{21}$ independently represent an aliphatic group or aryl group; j represents 1 or 2; and $R_{20}$ and $R_{21}$ may be bound to each other to form a ring.

When each of $R_1$ to $R_6$, $R_8$, and $R_{11}$ to $R_{21}$ in the formulae [S-1] to [S-9] is an aliphatic group or a group containing an aliphatic group, the aliphatic group may be linear, branched or cyclic, and may contain an unsaturated bond or may have a substituent group. Examples of the substituent group include a halogen atom, aryl group, alkoxy group, aryloxy group, alkoxycarbonyl group, hydroxyl group, acyloxy group, epoxy group etc.

When each of $R_1$ to $R_6$, $R_8$, and $R_{11}$ to $R_{21}$ in the formulae [S-1] to [S-9] is an alicyclic group (that is, a cycloalkyl group) or a group containing a cycloalkyl group, the cycloalkyl group may contain an unsaturated bond in a 3- to 8-membered ring, or may have a substituent group or a crosslinking group. Examples of the substituent group include a halogen atom, aliphatic group, hydroxyl group, acyl group, aryl group, alkoxy group, epoxy group etc., and examples of the crosslinking group include methylene, ethylene, isopropylidene etc.

When each of $R_1$ to $R_6$, $R_{11}$ to $R_{21}$, and Ar in the formulae [S-1] to [S-9] is an aryl group or a group containing an aryl group, the aryl group may be substituted with a substituent group such as a halogen atom, aliphatic group, aryl group, alkoxy group, aryloxy group or alkoxycarbonyl group.

When $R_7$, $R_9$ or $R_{10}$ in the formulae [S-3], [S-4] and [S-5] is a hydrocarbon group, the hydrocarbon group may contain a cyclic structure (for example a benzene ring, cyclopentane ring, cyclohexane ring) or an unsaturated bond, and may have a substituent group. Examples of the substituent group include a halogen atom, hydroxyl group, acyloxy group, aryl group, alkoxy group, aryloxy group, epoxy group etc.

Among the high-boiling organic solvents represented by the formulae [S-1] to [S-9], particularly preferable high-boiling organic solvents are described below.

Preferably $R_1$, $R_2$ and $R_3$ in the formula [S-1] independently represent a C1 to C24 (preferably C4 to C18) aliphatic group (for example n-butyl, n-hexyl, n-octyl, EH-octyl, 2-ethylhexyl, 3,3,5-trimethylhexyl, 3,5,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, 4-methylcyclohexyl) or a C6 to C24 (preferably C6 to C18) aryl group (for example phenyl, cresyl, p-nonylphenyl, xylyl, cumenyl, p-methoxyphenyl, p-methoxycarbonylphenyl). Among these groups, each of $R_1$, $R_2$ and $R_3$ is particularly preferably n-hexyl, n-octyl, EH-octyl, 2-ethylhexyl, 3,5,5-trimethylhexyl, n-dodecyl, 2-chloroethyl, 2-butoxyethyl, cyclohexyl, phenyl, cresyl, p-nonylphenyl or cumenyl.

a, b and c independently represent 0 or 1, and more preferably, all of a, b and c represent 1.

Preferably $R_4$ and $R_5$ in the formula [S-2] independently represent a C1 to C24 (preferably C4 to C18) aliphatic group (for example the same group as the aliphatic group mentioned in $R_1$ above, heptyl, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, menthyl, bornyl, 1-methylcyclohexyl), or a C6 to C24 (preferably 6 to 18) aryl group (preferably the aryl group mentioned in $R_1$ above, 4-t-butylphenyl, 4-t-octylphenyl, 1,3,5-trimethylphenyl, 2,4-di-t-butylphenyl, 2,4-di-t-pentylphenyl). More preferably, $R_4$ or $R_5$ is an aliphatic group, particularly n-butyl, heptyl, 2-ethylhexyl, n-dodecyl, 2-butoxyethyl or ethoxycarbonylmethyl.

Preferably $R_6$ is a halogen atom (preferably a chlorine atom), a C1 to C18 alkyl group (for example methyl, isopropyl, t-butyl, n-dodecyl), a C1 to C18 alkoxy group (for example methoxy, n-butoxy, n-octyloxy, methoxyethoxy, benzyloxy), a C6 to C18 aryloxy group (for example phenoxy, p-tolyloxy, 4-methoxyphenoxy, 4-t-butylphenoxy) or a C2 to C19 alkoxycarbonyl group (for example methoxycarbonyl, n-butoxycarbonyl, 2-ethylhexyloxycarbonyl) or a C6 to C25 aryloxycarbonyl group. More preferably, $R_6$ is an alkoxycarbonyl group, particularly n-butoxycarbonyl.

d is 0 or 1.

In the formula [S-3], Ar is preferably a C6 to C24 (preferably C6 to C18) aryl group (for example phenyl, 4-chlorophenyl, 2,4-dichlorophenyl, 4-methoxyphenyl, 1-naphthyl, 4-n-butoxyphenyl, 1,3,5-trimethylphenyl, 2-(2-n-butoxycarbonylphenyl)phenyl), among which Ar is particularly preferably phenyl, 2,4-dichlorophenyl, or 2-(2-n-butoxycarbonylphenyl)phenyl. e is an integer of 1 to 4 (preferably 1 to 3).

$R_7$ is an e-valent C2 to C24 (preferably C2 to C18) hydrocarbon group [for example the aliphatic group mentioned in $R_4$ above, n-octyl, the aryl group mentioned in $R_4$ above, —(CH$_2$)$_2$—,

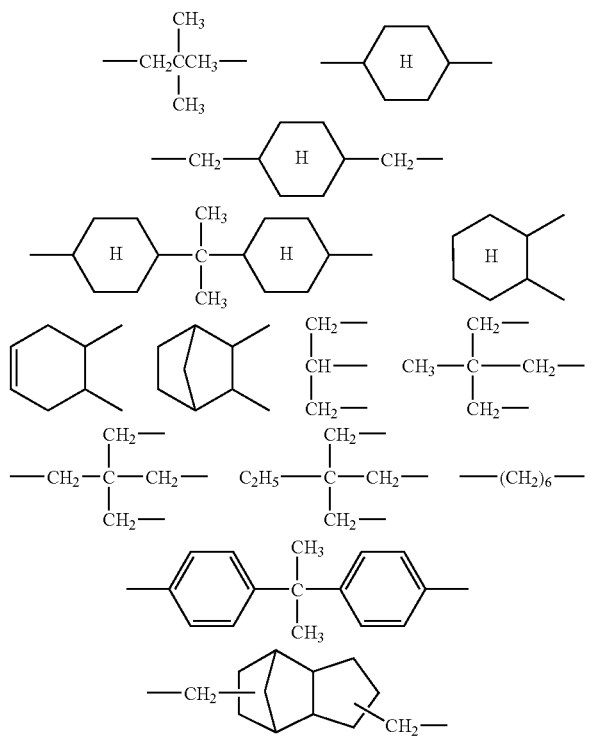

] or an ether-linkage containing e-valent C4 to C24 (preferably C4 to 18) hydrocarbon group [for example, —CH$_2$CH$_2$OCH$_2$CH$_2$—, —CH$_2$CH$_2$(OCH$_2$CH$_2$)$_3$—, —CH$_2$CH$_2$CH$_2$OCH$_2$CH$_2$CH$_2$—], or

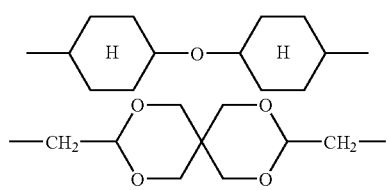

-continued

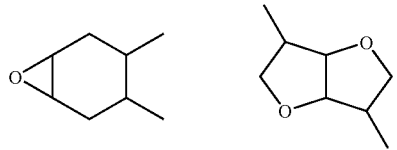

More preferably, $R_7$ is an alkyl group, particularly n-butyl, n-octyl or 2-ethylhexyl.

In the formula [S-4], $R_8$ represents a C1 to C24 (preferably C1 to C17) aliphatic group (for example methyl, n-propyl, 1-hydroxyethyl, 1-ethylpentyl, n-heptyl, n-undecyl, n-tridecyl, pentadecyl, 8,9-epoxyheptadecyl, cyclopropyl, cyclohexyl, 4-methylcyclohexyl), among which $R_8$ is particularly preferably n-heptyl, n-tridecyl, 1-hydroxyethyl, 1-ethylpentyl or 8,9-epoxyheptadecyl.

f is an integer of 1 to 4 (preferably 1 to 3).

$R_9$ is preferably an f-valent C2 to C24 (preferably C2 to C18) hydrocarbon group or an ether linkage-containing f-valent C4 to C24 (preferably C4 to C18) hydrocarbon group (for example, the same group as mentioned in $R_7$ above, 1-methyl-2-methoxyethyl, 2-hexyldecyl), among which $R_9$ is particularly preferably 2-ethylhexyl, 2-hexyldecyl, 1-methyl-2-methoxyethyl, or

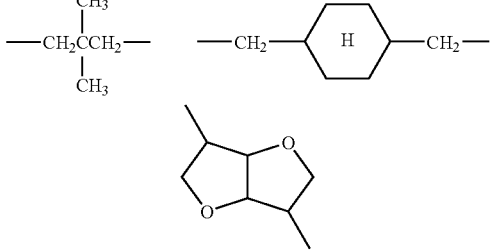

In the formula [S-5], g is 2 to 4 (preferably 2 or 3).

$R_{10}$ is a g-valent hydrocarbon group [for example, —CH$_2$—, —(CH$_2$)$_2$—, —(CH$_2$)$_4$—, —(CH$_2$)$_7$—, —(CH$_2$)$_8$—, or

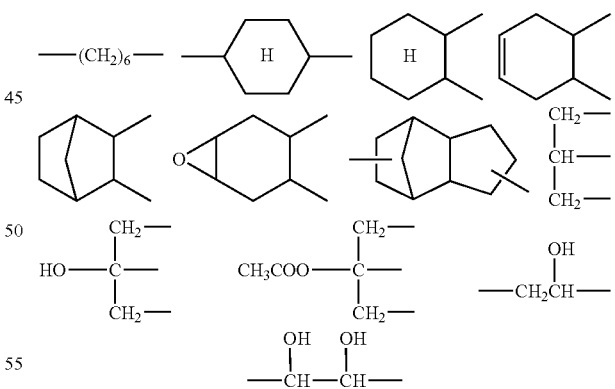

] and particularly $R_{10}$ is preferably —(CH$_2$)$_4$—, —(CH$_2$)$_8$—, or

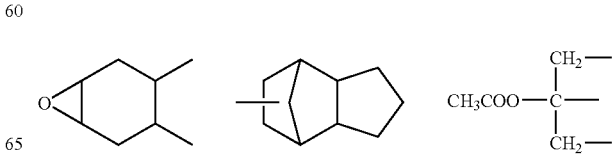

$R_{11}$ is preferably a C1 to C24 (preferably C4 to C18) aliphatic group or a C6 to C24 (preferably C6 to C18) aryl group (for example, the same aliphatic or aryl group as mentioned in $R_4$ above), among which $R_{11}$ is more preferably an alkyl group, particularly n-butyl, n-octyl or 2-ethylhexyl.

In the formula [S-6], $R_{12}$ is preferably a hydrogen atom, a C1 to C24 aliphatic group (preferably C3 to C20) [for example, n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy) propyl, cyclohexyl, 4-methylcyclohexyl, 8-N,N-diethylcarbamoyloctyl] or a C6 to C24 (preferably C6 to C18) aryl group (for example, the same aryl group as mentioned in Ar above, 3-methylphenyl, 2-(N,N-di-n-octylcarbamoyl)phenyl), among which $R_{12}$ is particularly preferably n-undecyl, 8-N,N-diethylcarbamoyloctyl, 3-methylphenyl, or 2-(N,N-di-n-octylcarbamoyl)phenyl.

Each of $R_{13}$ and $R_{14}$ is preferably a hydrogen atom, a C1 to C24 (preferably C1 to C18) aliphatic group (for example, methyl, ethyl, isopropyl, n-butyl, n-hexyl, n-octyl, 2-ethylhexyl, n-dodecyl, n-tetradecyl, cyclopentyl, cyclopropyl) or a C6 to C18 (preferably C6 to C15) aryl group (for example, phenyl, 1-naphthyl, p-tolyl), among which each of $R_{13}$ and $R_{14}$ is particularly preferably methyl, ethyl, n-butyl, n-octyl, n-tetradecyl or phenyl.

$R_{13}$ and $R_{14}$, together with N, may be combined with each other to form a pyrrolidine ring, piperidine ring or morpholine ring, and $R_{12}$ and $R_{13}$, together with N, may be combined with each other to form a pyrrolidone ring or piperidine ring.

X is —CO— or —SO$_2$—, preferably —CO—.

In the formula [S-7], $R_{15}$ is preferably a C1 to C24 (preferably C3 to C18) aliphatic group (for example, methyl, isopropyl, t-butyl, t-pentyl, t-hexyl, t-octyl, 2-butyl, 2-hexyl, 2-octyl, 2-dodecyl, 2-hexadecyl, t-pentadecyl, cyclopentyl, cyclohexyl), a C2 to C24 (preferably C5 to C17) alkoxycarbonyl group (for example, n-butoxycarbonyl, 2-ethylhexyloxycarbonyl, n-dodecyloxycarbonyl), a C7 to C24 (preferably C7 to C18) aryloxycarbonyl group (for example, a phenoxycarbonyl group, naphthoxycarbonyl group, cresyloxycarbonyl group), a C1 to C24 (preferably 1 to C18) alkylsulfonyl group (for example, methylsulfonyl, n-butylsulfonyl, n-dodecylsulfonyl), a C6 to C30 (preferably C6 to C24) arylsulfonyl group (for example, p-tolylsulfonyl, p-dodecylphenylsulfonyl, p-hexadecyloxyphenylsulfonyl), a C6 to C32 (preferably C6 to C24) aryl group (for example, phenyl, p-tolyl) or a cyano group, among which $R_{15}$ is more preferably a C1 to C24 aliphatic group or a C1 to C24 alkoxycarbonyl group, particularly preferably a C1 to C24 aliphatic group.

$R_{16}$ is preferably a halogen atom (preferably Cl), a C1 to C24 (preferably C1 to C18) aliphatic group [more preferably, an alkyl group (for example, the same group as mentioned in $R_{15}$ above), a C3 to C18 (preferably C5 to C17) cycloalkyl group (for example, cyclopentyl, cyclohexyl)], a C6 to C32 (preferably C6 to C24) aryl group (for example, phenyl, p-tolyl), a C1 to C24 (preferably C1 to C18) alkoxy group (for example, methoxy, n-butoxy, 2-ethylhexyloxy, benzyloxy, n-dodecyloxy, n-hexadecyloxy) or a C6 to C32 (preferably C6 to C24) aryloxy group (for example, phenoxy, p-t-butylphenoxy, p-t-octylphenoxy, m-pentadecylphenoxy, p-dodecyloxyphenoxy), among which $R_{16}$ is more preferably a C1 to C24 aliphatic group, particularly preferably a C1 to C12 aliphatic group.

h is an integer of 1 to 2.

In the formula [S-8], preferable examples of $R_{17}$ and $R_{18}$ are the groups (excluding a hydrogen atom) shown in $R_{13}$ and $R_{14}$ above, and particularly each of $R_{17}$ and $R_{18}$ is more preferably an aliphatic group, particularly preferably n-butyl, n-octyl, or n-dodecyl, provided that $R_{17}$ and $R_{18}$ are not bound to each other to form a ring.

Preferable examples of $R_{19}$ are the same as shown in $R_{16}$ above, and particularly $R_{19}$ is preferably an alkyl or alkoxy group, more preferably n-octyl, methoxy, n-butoxy or n-octyloxy.

i is an integer of 1 to 5.

In the formula [S-9], preferable examples of $R_{20}$ and $R_{21}$ when not bound to each other to form a ring are the same as shown in $R_1$, $R_2$ and $R_3$ above, and particularly each of $R_{20}$ and $R_{21}$ is preferably a C1 to C24 substituted or unsubstituted aliphatic group.

$R_{20}$ and $R_{21}$ may be bound to each other to form a ring, and the formed ring is preferably a 3- to 10-membered ring, more preferably a 5- to 7-membered ring.

j represents 1 or 2, preferably 1.

Specific examples (S-1 to S-53) of the high-boiling organic solvent used in the invention, and the viscosity (value measured by the above-described means under the atmosphere of 25° C. and 60° C.) and boiling point of each high-boiling organic solvent are shown below. The boiling of the high-boiling organic solvent described in the specification is a value converted from the boiling point thereof at the time of distillation under reduced pressure into that under normal pressures. In the specific examples shown below, it has been confirmed that high-boiling organic solvents not provided with boiling point do not boil at 170° C. High-boiling organic solvents not provided with viscosity at 25° C. are meant be solid at 25° C.

|  |  | Viscosity (mPa·s) | | Boiling Point (° C.) |
| --- | --- | --- | --- | --- |
|  |  | (25° C.) | (60° C.) |  |
| Compounds represented by Formula [S-1] | | | | |
| S-1 | 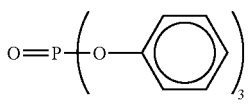 | — | 8.3 | 370 |
| S-2 | 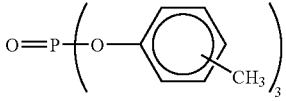 | 57.6 | 11.8 | 435 |

-continued

| | | Viscosity (mPa·s) | | |
|---|---|---|---|---|
| | | (25° C.) | (60° C.) | Boiling Point (° C.) |
| S-3 | 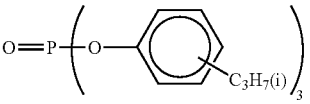 O=P(―O―C₆H₄―C₃H₇(i))₃ | 95 | 17.5 | 485 |
| S-4 | 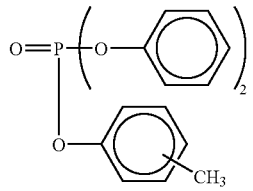 O=P(―O―C₆H₅)₂(―O―C₆H₄―CH₃) | 65 | 12.8 | 435 |
| S-5 | 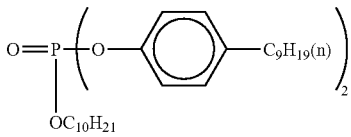 O=P(―O―C₆H₄―C₉H₁₉(n))₂(OC₁₀H₂₁) | 49 | 10.3 | 435 |
| S-6 | O=P(OCH₂CHC₄H₉(n))₃ $\mid$ C₂H₅ | 11.7 | 4.0 | 390 |
| S-7 | O=P(OCH₂CH₂CHCH₂CCH₃)₃ with CH₃, CH₃, CH₃ substituents | 20.22 | 5.8 | 420 |
| S-8 | O=P(OC₁₂H₂₅(n))₃ | 28.6 | 6.9 | 480 |
| S-9 | O=P(OC₆H₁₃(n))₃ | 6.62 | 3.0 | 365 |
| S-10 | O=P(OCH₂CH₂Cl)₃ | 20.8 | 5.5 | 360 |
| S-11 | O=P(OCH₂CH₂O₄H₉(n))₃ | 10.9 | 3.8 | 400 |
| S-12 | ((EH)C₈H₁₇)₃P=O | 41.1 | 9.0 | — |
| S-13 | (n)C₈H₁₇―P(OC₈H₁₇(n))₂ ‖ O | 13.7 | 4.3 | — |

Compounds represented by Formula [S-2]

| S-14 | 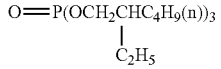 benzene with COOC₄H₉(n), COOC₄H₉(n) | 20.3 | 5.1 | 370 |
| S-15 | 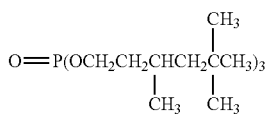 benzene with COOC₇H₁₅(branched), COOC₇H₁₅(branched) | 34.9 | 8.0 | 380 |
| S-16 | 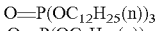 benzene with COOCH₂CHC₄H₉(n) (C₂H₅), COOCH₂CHC₄H₉(n) (C₂H₅) | 62.7 | 11.7 | 400 |
| S-17 |  benzene with COOC₁₂H₂₅(n), COOC₁₂H₂₅(n) | 52.1 | 10.8 | — |

-continued

| | | Viscosity (mPa·s) | | Boiling Point (°C) |
|---|---|---|---|---|
| | | (25°C.) | (60°C.) | |
| S-18 | benzene with two ortho -COOCH$_2$CH$_2$OC$_4$H$_9$(n) groups | 42 | 9.1 | 335 |
| S-19 | benzene with ortho -COOC$_2$H$_5$ and -COOCH$_2$COOC$_2$H$_5$ | 74 | 14.2 | 355 |
| S-20 | benzene with -COOC$_4$H$_9$(n), -COOC$_4$H$_9$(n), and (n)C$_4$H$_9$OOC- substituents | 55.7 | 13.1 | 400 |
| Compounds represented by Formula [S-3] | | | | |
| S-21 | phenyl-COOCH$_2$CH(C$_2$H$_5$)C$_4$H$_9$(n) | 5.68 | 2.4 | 300 |
| S-22 | 2,4-dichlorophenyl-COOC$_8$H$_{17}$(n) | 11.44 | 3.9 | 360 |
| S-23 | biphenyl-2,2'-bis(COOC$_4$H$_9$(n)) | 51.1 | 10.6 | — |
| Compounds represented by Formula [S-4] | | | | |
| S-24 | (n)C$_{13}$H$_{27}$COOCH(CH$_3$)CH$_2$OCH$_3$ | 7.17 | 3.1 | 380 |
| S-25 | (n)C$_8$H$_{17}$CH—CH(CH$_2$)$_7$COOCH$_2$CH(C$_2$H$_5$)C$_4$H$_9$(n) with epoxide O | 39.84 | 8.8 | — |
| S-26 | CH$_3$CH(OH)COOCH$_2$CH(C$_6$H$_{13}$(n))C$_8$H$_{17}$(n) | 22.83 | 5.9 | — |
| S-27 | (n)C$_4$H$_9$CH(C$_2$H$_5$)COOCH$_2$C(CH$_3$)$_2$CH$_2$OCOCH(C$_2$H$_5$)C$_4$H$_9$(n) | 12 | 4.0 | — |
| S-28 | (n)C$_4$H$_9$CH(C$_2$H$_5$)COOCH$_2$—(cyclohexyl)—CH$_2$OCOCH(C$_2$H$_5$)C$_4$H$_9$(n) | 41.4 | 9.0 | 430 |

|   |   | Viscosity (mPa·s) | | Boiling Point (° C.) |
|---|---|---|---|---|
|   |   | (25° C.) | (60° C.) |   |
| S-29 | (n)C$_7$H$_{15}$COO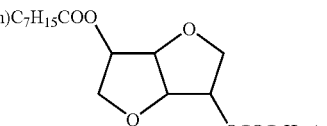OCOC$_7$H$_{15}$(n) | 47.3 | 10.0 | 440 |

Compounds represented by Formula [S-5]

|   |   | (25° C.) | (60° C.) |   |
|---|---|---|---|---|
| S-30 | (n)C$_7$H$_{15}$COO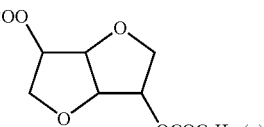OCOC$_7$H$_{15}$(n) | 11.7 | 4.3 | 390 |
| S-31 | (n)C$_4$H$_9$CHCH$_2$OCO(CH$_2$)$_4$COOCH$_2$CHC$_4$H$_9$(n) with C$_2$H$_5$ groups | 19.9 | 6.1 | 410 |
| S-32 | (n)C$_4$H$_9$OCO(CH$_2$)$_8$COOC$_4$H$_9$(n) | 8.09 | 3.5 | 345 |
| S-33 |  COOC$_8$H$_{17}$(n), COOC$_8$H$_{17}$(n) | 88.9 | 16.5 | — |
| S-34 | (n)C$_4$H$_9$OCO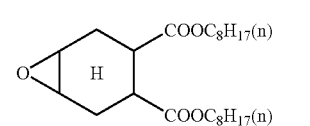COOC$_4$H$_9$(n) | 37.50 | 8.4 | 440 |
| S-35 | CH$_3$COO—C(CH$_2$COOC$_4$H$_9$(n))(COOC$_4$H$_9$(n))(CH$_2$COOC$_4$H$_9$(n)) | 42.7 | 9.3 | 390 |

Compounds represented by Formula [S-6]

|   |   | (25° C.) | (60° C.) |   |
|---|---|---|---|---|
| S-36 | (n)C$_{11}$H$_{23}$CON(C$_4$H$_9$(n))$_2$ | 9.45 | 3.6 | 340 |
| S-37 | 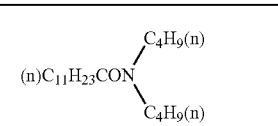 | 45.8 | 9.8 | — |
| S-38 | 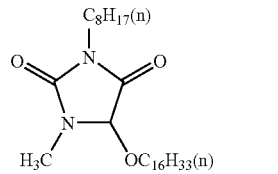 | 20.0 | 5.4 | 350 |
| S-39 | 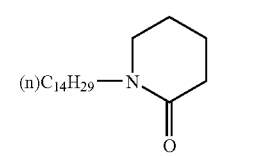 | 12.83 | 4.2 | 320 |

-continued

| | | Viscosity (mPa·s) | | |
|---|---|---|---|---|
| | | (25° C.) | (60° C.) | Boiling Point (° C.) |
| S-40 | ((n)C₈H₁₇)₂NOC—C₆H₄—CON(C₈H₁₇(n))₂ | 77.1 | 14.7 | — |
| S-41 | (C₂H₅)₂—NCO—(CH₂)₈—CON(C₂H₅)₂ | 40.7 | 8.9 | 405 |
| S-42 | CH₃—C₆H₄—SO₂N(C₄H₉(n))₂ | 49.65 | 10.4 | — |

Compounds represented by Formula [S-7]

| S-43 | 2,4-di-tert-butylphenol | 92 | 16.9 | — |

Compounds represented by Formula [S-8]

| S-44 | 2-(OC₈H₁₇(n))-C₆H₄-N(C₈H₁₇(n))₂ | 15.5 | 4.6 | — |
| S-45 | 2,4-di(OCH₃)-C₆H₃-N(C₁₂H₂₅(n))₂ | 27.1 | 6.6 | — |
| S-46 | 2-(OCH₃)-C₆H₄-N(C₈H₁₇(n))₂ | 35.3 | 8.0 | — |
| S-47 | 2-(OC₄H₉(n))-5-(C₈H₁₇(t))-C₆H₃-N(C₄H₉(n))₂ | 79.14 | 15.0 | — |

Compounds represented by Formula [S-9]

| S-48 | 3-(C₈H₁₇(EH))-tetrahydrothiophene 1,1-dioxide | 37.62 | 8.4 | — |
| S-49 | C₆H₅—CH₂SOCH(C₁₂H₂₅(n))COOC₂H₅ | 43.1 | 9.3 | — |

-continued

| | | Viscosity (mPa·s) | | |
|---|---|---|---|---|
| | | (25° C.) | (60° C.) | Boiling Point (° C.) |
| Other Compounds | | | | |
| S-50 | $C_nH_{2n+1}$ (Mixture of normal-paraffin (n = 14, 15)) (for example, NP—SH manufactured by Mitsui Texaco Chemical Co.) | 2.47 | 0.4 | 260 |
| S-51 | 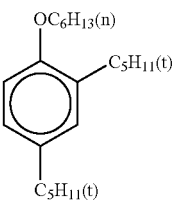 | 35.85 | 8.1 | 330 |
| S-52 | 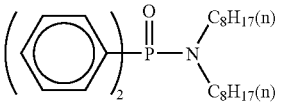 | 45.9 | 9.8 | — |
| S-53 | 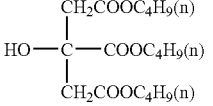 | 25.82 | 6.7 | — |

In the invention, the high-boiling organic solvents may be used alone or as a mixture of two or more thereof [for example, a mixture of tricresyl phosphate and dibutyl phthalate, trioctyl phosphate and di(2-ethylhexyl) sebacate, or dibutyl phthalate and poly(N-t-butylacrylamide)].

The mass ratio of the colorant to the high-boiling organic solvent in the invention is established such that the colorant: high-boiling organic solvent are preferably 1:0.01 to 1:1, more preferably 1:0.05 to 1:0.5.

Examples of the high-boiling organic solvent used in the invention, excluding those described above, and/or methods of synthesizing these high-boiling organic solvents, are described in U.S. Pat. No. 2,322,027, U.S. Pat. No. 2,533,514, U.S. Pat. No. 2,772,163, U.S. Pat. No. 2,835,579, U.S. Pat. No. 3,594,171, U.S. Pat. No. 3,676,137, U.S. Pat. No. 3,689,271, U.S. Pat. No. 3,700,454, U.S. Pat. No. 3,748,141, U.S. Pat. No. 3,764,336, U.S. Pat. No. 3,765,897, U.S. Pat. No. 3,912,515, U.S. Pat. No. 3,936,303, U.S. Pat. No. 4,004,928, U.S. Pat. No. 4,080,209, U.S. Pat. No. 4,127,413, U.S. Pat. No. 4,193,802, U.S. Pat. No. 4,207,393, U.S. Pat. No. 4,220,711, U.S. Pat. No. 4,239,851, U.S. Pat. No. 4,278,757, U.S. Pat. No. 4,353,979, U.S. Pat. No. 4,363,873, U.S. Pat. No. 4,430,421, U.S. Pat. No. 4,430,422, U.S. Pat. No. 4,464,464, U.S. Pat. No. 4,483,918, U.S. Pat. No. 4,540,657, U.S. Pat. No. 4,684,606, U.S. Pat. No. 4,728,599, U.S. Pat. No. 4,745,049, U.S. Pat. No. 4,935,321, U.S. Pat. No. 5,013,639, EP No. 276,319A, EP No. 286,253A, EP No. 289,820A, EP No. 309,158A, EP No. 309,159A, EP No. 309,160A, EP No. 509,311A, EP No. 510,576A, East German Patent Nos. 147009, 157147, 159573, and 225240A, GB-C No. 2,091,124A, JP-A No. 48-47335, JP-A No. 50-26530, JP-A No. 51-25133, JP-A No. 51-26036, JP-A No. 51-27921, JP-A No. 51-27922, JP-A No. 51-149028, JP-A No. 52-46816, JP-A No. 53-1520, JP-A No. 53-1521, JP-A No. 53-15127, JP-A No. 53-146622, JP-A No. 54-91325, JP-A No. 54-106228, JP-A No. 54-118246, JP-A No. 55-59464, JP-A No. 56-64333, JP-A No. 56-81836, JP-A No. 59-204041, JP-A No. 61-84641, JP-A No. 62-118345, JP-A No. 62-247364, JP-A No. 63-167357, JP-A No. 63-214744, JP-A No. 63-301941, JP-A No. 64-9452, JP-A No. 64-9454, JP-A No. 64-68745, JP-A No. 1-101543, JP-A No. 1-102454, JP-A No. 2-792, JP-A No. 2-4239, JP-A No. 2-43541, JP-A No. 4-29237, JP-A No. 4-30165, JP-A No. 4-232946 and JP-A No. 4-346338.

(Storage Stabilizer)

In the invention, a storage stabilizer can be added for the purpose of inhibiting undesired polymerization of a plurality of liquids during storage. The storage stabilizer is used preferably in the liquid containing the polymerizable compound, and is preferably soluble in the liquid or in other coexisting components.

The storage stabilizer includes quaternary ammonium salts, hydroxylamine and derivatives thereof, cyclic amides, nitrile and derivatives thereof, substituted urea and derivatives thereof, heterocyclic compounds, organic acids, hydroquinone, hydroquinone monoethers, organic phosphines and copper compounds, and specific examples include benzyl trimethyl ammonium chloride, diethyl hydroxylamine, benzothiazole, 4-amino-2,2,6,6-tetramethyl piperidine, citric acid, hydroquinone monomethyl ether, hydroquinone monobutyl ether and copper naphthenate.

Preferably, the amount of the storage stabilizer is regulated suitably depending on the activity of the polymerization initiator used, the polymerization properties of the polymerizable compound, and the type of the storage stability, and from the viewpoint of the balance between storage stability and the curing properties of ink at the time of mixing the liquids, the amount of the storage stabilizer in the liquid is preferably 0.005 to 1 mass %, more preferably 0.01 to 0.5 mass %, still more preferably 0.01 to 0.2 mass %, in terms of solids content.

(Electroconductive Salts)

Electroconductive salts are solid compounds for improving electrical conductivity. In the invention, it is preferable that the electroconductive salt is substantially not used because of concern about precipitation during storage, but when the electroconductive salt has increased solubility or is made excellent in solubility by using a highly soluble liquid component, a suitable amount of the electroconductive salt may be added. Examples of the electroconductive salt include potassium thiocyanate, lithium nitrate, ammonium thiocyanate, dimethylamine hydrochloride, etc.

(Other Additives)

As other additives, known additives such as a polymer, a surface intention regulator, an UV absorber, an antioxidant, a fading inhibitor and a pH adjusting agent can be simultaneously used.

With respect to the surface intention regulator, UV absorber, antioxidant, fading inhibitor and pH adjusting agent, known compounds may be suitably selected and used, and specifically additives described in, for example, JP-A No. 2001-181549 can be used.

In addition to the additives described above, a set of compounds which when mixed, are reacted with each other to form aggregates or to thicken the liquid can be contained in liquids different from one another. A set of the compounds are characterized by rapidly forming aggregates or rapidly thickening the liquid thereby effectively suppressing occurrence of the interference between adjacent discharged droplets.

The reaction of a set of compounds which when mixed, are reacted with each other to form aggregates or to thicken the liquid includes, for example, an acid/base reaction, a hydrogen bonding reaction by a carboxylic acid/amide group-containing compound, a crosslinking reaction represented by boric acid/diol, and a reaction due to electrostatic interaction by cation/anion.

<Ink for Ink Jet Recording: Third Mode of the Invention>

The ink for ink jet recording in the third mode of the invention comprises at least the high-boiling organic solvent and the oil-soluble polymer. The ink can further contain the polymerization initiator, and preferably the ink does substantially not contain the colorant and the polymerizable compound. That is, the preferable composition and mode of the first liquid in the first mode of the invention can apply to the ink for ink jet recording in the invention.

The ink for ink jet recording in the invention is used preferably as the first liquid in the ink set for ink jet recording in the first mode of the invention. The ink for ink jet recording in the invention, similar to the ink set described above, can be used in such a mode to suppress bleeding and interference between discharged droplets.

<Ink Jet Image Recording Method: Second Mode of the Invention>

Now, the ink jet image recording method in the second mode of the invention is described.

The ink jet image recoding method of the invention (hereinafter, referred to sometimes as "image recording method") comprises using the ink set for ink jet recording in the first mode of the invention, and applying the first and second liquids simultaneously onto a recording medium, or applying, first, one of the liquids and then the other onto a recording medium so as to contact both the liquids with each other, thus forming an image.

The first liquid comprising an oil-soluble polymer and the second liquid preferably comprising a colorant are applied so as to contact with each other thereby effectively preventing bleeding and interference between discharged droplets and forming an image free of color segregation.

(Means of Applying the Liquids)

In the image recording method described above, it is not always necessary that a plurality of liquids including the first and second liquids be applied by jetting via ink jet nozzles onto a recording medium, and the liquids may be applied by other means such as coating, but the second liquid comprising a colorant is applied preferably by jetting via ink jet nozzles onto a recording medium, and it is more preferable from the viewpoint of preventing bleeding and interference between discharged droplets that while or after the first liquid is applied, the second liquid is jetted via ink jet nozzles.

Now, the means of applying the first liquid onto a recording medium in the image recording method will be described. The means of applying the second liquid will be described by reference to jetting via ink jet nozzles in the preferable mode as described above.

Specific examples of the application means include, but are not limited to, the following two means:

(i) Coating by an Applicator

In a preferable mode of the ink jet image recording method of the invention, the first liquid is applied by an applicator onto a recording medium and then the second liquid is jetted through ink jet nozzles onto the recording medium thereby forming an image.

The applicator is not particularly limited, and a known applicator can suitably selected, and examples include an air doctor coater, blade coater, rod coater, knife coater, squeeze coater, dipping coater, reverse roll coater, transfer roll coater, gravure coater, kiss-roll coater, cast roller, spray coater, curtain coater, extrusion coater etc. Specifically, reference is made to "Coating Kogaku" (Coating Engineering) written by Yuji Harasaki The ink jet nozzle is not particularly limited, and a known nozzle can be suitably selected depending on the object. The ink jet nozzle (ink jet system) will be described later in more detail.

A liquid other than the first and second liquids may be applied onto a recording medium by any methods such as application with the applicator described above or jetting via ink jet nozzles, and the timing of application is not particularly limited, but when the liquid contains a colorant, the liquid is applied preferably by a means of jetting via ink jet nozzles, which is carried out preferably after application of the first liquid.

(ii) Jetting Through Ink Jet Nozzles

In a preferable mode, the first liquid is jetted through ink jet nozzles, and simultaneously or thereafter the second liquid is jetted similarly through ink jet nozzles thereby forming an image.

The ink jet nozzle is the same as described above.

As described above, a liquid other than the first and second liquids may be applied onto a recording medium by any methods such as application with the applicator described above or jetting via ink jet nozzles, and the timing of application is not particularly limited, but when the liquid contains a colorant, the liquid is applied preferably by a means of jetting via ink jet nozzles, which is carried out preferably after application of the first liquid.

The ink set for ink jet recording according to the invention exhibits its excellent effect significantly by using the ink jet recording method in the mode wherein all other liquids are applied by the means (ii) above, that is, jetting via ink jet nozzles.

Now, the system of jetting via ink jet nozzles (ink jet recording system) is described. In the invention, it is preferable to employ known systems such as an electric charge regulating system of discharging an ink by utilizing electrostatic attraction, a drop-on-demand system of using vibrational pressure of an piezo element (pressure pulse system), an acoustic ink jet system of discharging an ink by utilizing radiant pressure upon irradiating the ink with an acoustic beam converted from an electric signal, and a thermal ink jet (Bubble Jet®) system of using pressure generated by bubbles upon heating of an ink.

The ink jet recording system includes a system of discharging a large number of small droplets of low-concentration ink called photo-ink, a system of improving image qualities by using a plurality of inks substantially identical in hue but different in concentration, and a system of using colorless and transparent ink.

When the means (i) above is used, an image is formed by applying at least the second ink by the ink jet recording system onto a recording medium onto which the first liquid has been applied. On the other hand, when the means (ii) above is used, an image is formed by applying at least the first and second liquids simultaneously or one after another onto a recording medium by the ink jet recording system.

When two or more liquids are jetted onto a recording medium by the ink jet recording system, these liquids are applied so as to contact with one another. The mode of contacting two or more liquids with one another is not particularly limited, and the liquids may be jetted so as to be adjacent to one another or may be jetted onto the same region.

The timing of jetting is arbitrary, and the liquids may be jetted simultaneously or one after another. When the liquids are jetted one after another, it is preferable that one second or less after the first liquid is jetted, the next liquid is jetted. The volume of one droplet is not particularly limited and is selected depending on the sharpness of an image formed, and generally the volume of one droplet of each liquid is preferably about 0.5 to 10 pl.

When the first liquid is jetted via ink jet nozzles prior to the second liquid in the means (i) above, the first liquid itself is contacted directly with a recording medium thus generating interference between discharged droplets to indent the periphery of the discharged droplets on the recording medium. However, the first liquid does not contain a colorant, so this interference between discharged droplets is not problematic.

Whether either the means (i) or (ii) is used, the second liquid is jetted simultaneously with the first liquid or jetted onto a recording medium onto which the first liquid has been applied, such that the second liquid is contacted with the first liquid, thus preventing the interference between discharged droplets and allowing each droplet to be retained in the form of a dot. From the viewpoint of retaining the droplet in the form of a more excellent dot, it is preferable that the first liquid applied before the second liquid onto the recording medium is applied onto a broader region than a region onto which the second liquid is to be jetted.

In the ink set of two-liquid type, the balance between the two liquids in respect of the amount of one droplet discharged onto an image-forming part is established such that the ratio (ratio by mass per unit area) of the amount of the first liquid applied to the amount (=1) of the second liquid applied is preferably in the range of 0.05 to 5, more preferably in the range of 0.07 to 1, still more preferably in the range of 0.1 to 1. When the ratio of the first liquid to the second liquid is 5 or less, image qualities excellent in relief feel can be obtained, while when the ratio is 0.05 or more, the effect of the invention on prevention of interference between discharged droplets can be sufficiently achieved.

Preferable physical properties of the liquids (ink: the first and second liquids in the first mode of the invention, the ink for ink jet recording in the second mode of the invention) jetted onto a recording medium by the ink jet recording system are varied depending on a printer, but generally the viscosity of each liquid at 25° C. is preferably 5 to 100 mPa·s, more preferably 10 to 80 mPa·s. The surface tension of the ink composition is preferably 20 to 60 mN/m, more preferably 30 to 50 mN/m.

More preferable physical properties are that in relationship between the first and second liquids, the difference in viscosity therebetween is less than 25 mPa·s, and the difference in surface tension therebetween is less than 20 mN/m.

(Step of Applying Energy)

From the viewpoint of attaining excellent fixability, the image recording method can comprise a step of fixing a formed image by applying activation energy to the image. By applying activation energy, polymerization and curing reaction in aggregates can be accelerated to form a stronger image more effectively. Preferably the application of activation energy is carried out by light irradiation or heating.

Upon application of energy by light irradiation or heating, generation of an active species by decomposition of the polymerization initiator in the mixed liquid is accelerated, and simultaneously the polymerization reaction of the polymerizable compound, caused by the active species, is accelerated by an increase in the active species and an increase in temperature.

As a light source of exposure light for allowing polymerization of the polymerizable compound to proceed, a light source of UV ray, visible light or the like can be used in the invention. Radiations other than light, for example α-ray, γ-ray, X-ray or electron ray can be used in irradiation to give energy, among which UV ray and visible light are used preferably from the viewpoint of costs and safety, and UV ray is more preferably used. The amount of energy necessary for curing reaction varies depending on the type and content of the polymerization initiator, but is generally about 1 to 500 mJ/cm$^2$.

When energy is applied by heating, a recording medium is heated preferably for 0.1 to 1 second such that the surface temperature thereof is increased in the range of 40 to 80° C.

This heating is carried out by using a heating means of non-contact type, and it is preferable to use a means of heating by passage through a heating furnace such as an oven, or a means of heating by irradiation of the whole surface of a recording medium with UV, visible, or IR light. The light source used in light exposure as a heating means includes a metal halide lamp, xenon lamp, tungsten lamp, carbon arc lamp, and mercury lamp.

(Recording Medium)

Both an ink-permeable recording medium and an ink-impermeable or gradually permeable recording medium can be used in the invention. The ink-permeable recording medium includes paper, ink jet paper, coated paper, electrophotographic paper, cloth, nonwoven cloth, porous membrane, polymer absorbent etc. These are referred to as "recording material" in JP-A No. 2001-1891549 etc.

The excellent effect of the invention is exhibited significantly on an ink-impermeable or gradually permeable recording medium. The ink-impermeable or gradually permeable recording medium includes art paper, synthetic resin, rubber, resin-coated paper, glass, metal, pottery, wood etc. A composite base material consisting of a plurality of these materials can also be used to add additional functions.

As the synthetic resin, any synthetic resin can be used, and examples include polyesters such as polyethylene terephthalate and polybutadiene terephthalate, polyolefins such as polyvinyl chloride, polystyrene, polyethylene and polypropylene, acrylic resin, polyurethane, polycarbonate, acrylonitrile-butadiene-styrene copolymers, diacetate, triacetate, polyimide, cellophane, celluloid etc., and the thickness and shape of such synthetic resin base material are not particularly limited, and may be in the form of a film, card or block. These synthetic resins may be transparent or opaque.

The synthetic resin is used preferably in the form of a film for use in soft packaging, and a wide variety of non-absorptive plastics and their films can be used, and the various plastic films include, for example, PET film, OPS film, OPP film, PNy film, PVC film, PE film, TAC film etc. Polycarbonate, acrylic resin, ABS, polyacetal, PVA, rubber etc. can be used as other plastics.

The resin-coated paper includes, for example, a transparent polyester film, an opaque polyester film, an opaque polyolefin resin film, and a paper support comprising a paper laminated on both sides thereof with polyolefin resin, among which the paper support comprising a paper laminated on both sides with polyolefin resin is particularly preferable.

As the metal, any metal can be used, and particularly aluminum, iron, gold, silver, copper, nickel, titanium, chromium, molybdenum, silicon, lead and zinc, or composite materials thereof, such as stainless steel, are preferably used.

As the support used in the ink jet image recording method of the invention, a read only optical disk such as CD-ROM and DVD-ROM, a write once type optical disk such as CD-R and DVD-R, or a rewrite type optical disk can be used to provide the label surface thereof with an ink receiving layer and a gloss conferring layer.

EXAMPLES

Hereinafter, the present invention is described in more detail by reference to the Examples, but the invention is not limited thereto.

Example 1

1. Preparation of Second Liquid

| <Preparation of liquid (I-1) for ink jet recording> | |
|---|---|
| (A) Acid compound [compound (A-1) shown below] | 3.56 g |
| (B) Polymerizable compound: DPCA60 (Nippon Kayaku) | 1.07 g |
| (C) Polymerizable compound: 1,6-hexanediol diacrylate (HDDA: manufactured by Daicel UCB) | 8.53 g |
| (D) N-ethyl diethanolamine | 0.29 g |
| (E) Colorant [dye (M-1) shown below] | 0.46 g |

The above components were mixed and dissolved under stirring, to give magenta liquid (I-1) for ink jet recording. The viscosity of the liquid (I-1) at 25° C. was 19.6 mPa·s.

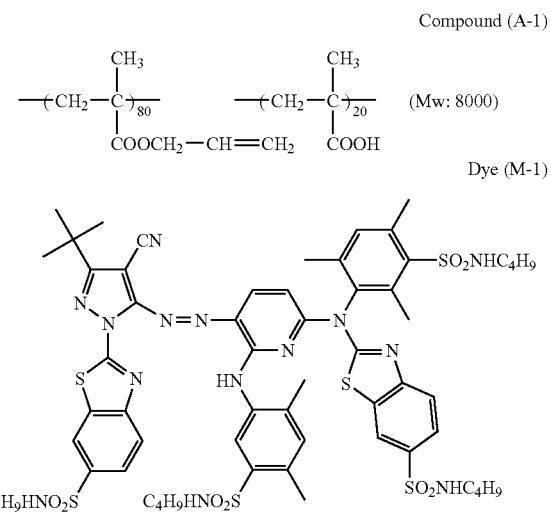

2. Preparation of First Liquid

| <Preparation of liquid (II-1) for ink jet recording containing the polymer of the invention> | |
|---|---|
| (F) High-boiling organic solvent [the above example (S-6)] | 10 g |
| (G) Polymerization initiator [TPO-L: the following (initiator-1)] | 1.8 g |
| (H) Polymer of the invention [the above example (P1-1)] | 2 g |

The above components were mixed and dissolved under stirring, to give liquid (II-1) for ink jet recording.

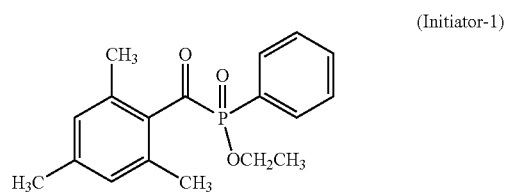

<Preparation of Liquids (II-2) to (II-27) for Ink Jet Recording Containing the Polymer of the Invention>

The liquids (II-2) to (II-27) for ink jet recording containing the polymer of the invention were prepared in the same manner as in preparation of the liquid (II-1) for ink jet recording except that the weight of the polymer of the invention was changed as shown in Tables 1 to 3 below.

The used polymers of the invention and the viscosity of each liquid are shown in Tables 1 to 3.

TABLE 1

| | Polymer of the Invention | Viscosity (mPa·s) | Weight-average molecular weight |
|---|---|---|---|
| II-1 | P1-1 | 26.5 | 8000 |
| II-2 | P1-3 | 24.3 | 7500 |
| II-3 | P1-4 | 23.8 | 8000 |
| II-4 | P1-11 | 19.5 | 8500 |
| II-5 | P1-13 | 22.7 | 9000 |
| II-6 | P1-9 | 27.9 | 8500 |
| II-7 | P1-10 | 28.0 | 9000 |

TABLE 1-continued

| Polymer of the Invention | | Viscosity (mPa · s) | Weight-average molecular weight |
|---|---|---|---|
| II-8 | P1-15 | 23.9 | 8000 |
| II-9 | P1-18 | 24.6 | 7500 |

TABLE 2

| Polymer of the Invention | | Viscosity (mPa · s) | Weight-average molecular weight |
|---|---|---|---|
| II-10 | P2-1 | 19.8 | 7500 |
| II-11 | P2-4 | 23.6 | 8500 |
| II-12 | P2-5 | 24.5 | 8000 |
| II-13 | P2-8 | 26.9 | 7500 |
| II-14 | P2-13 | 21.7 | 7500 |
| II-15 | P2-2 | 26.2 | 8000 |
| II-16 | P2-9 | 27.8 | 8500 |
| II-17 | P2-14 | 21.9 | 7500 |
| II-18 | P2-17 | 22.7 | 7000 |

TABLE 3

| Polymer of the Invention | | Viscosity (mPa · s) | Weight-average molecular weight |
|---|---|---|---|
| II-19 | P3-1 | 22.9 | 8000 |
| II-20 | P3-5 | 23.8 | 7500 |
| II-21 | P3-7 | 27.2 | 7500 |
| II-22 | P3-9 | 28.5 | 8500 |
| II-23 | P3-12 | 25.4 | 8000 |
| II-24 | P3-13 | 23.1 | 8000 |
| II-25 | P3-14 | 22.4 | 7500 |
| II-26 | P3-19 | 21.9 | 8000 |
| II-27 | P3-22 | 24.5 | 8000 |

3. Preparation of Ink of One Liquid Type

<Preparation of comparative liquid (I-0) of one-liquid type for ink jet recording>

| | |
|---|---|
| (A) Acid compound [the above compound (A-1)] | 3.56 g |
| (B) Polymerizable compound: DPCA60 (Nippon Kayaku) | 1.07 g |
| (C) Polymerizable compound: 1,6-hexanediol diacrylate (HDDA: manufactured by Daicel UCB) | 7.67 g |
| (D) N-ethyl diethanolamine | 0.29 g |
| (E) Colorant [the above dye (M-1)] | 0.46 g |
| (G) Polymerization initiator [TPO-L, the above (initiator-1)] | 1.81 g |

The above components were mixed and dissolved under stirring, to give magenta liquid (I-0) for ink jet recording. The viscosity of the liquid (I-0) at 25° C. was 19.6 mPa·s.

<Preparation of comparative liquid (I-00) of one-liquid type for ink jet recording>

| | |
|---|---|
| (A) Acid compound [the above compound (A-1)] | 3.56 g |
| (B) Polymerizable compound: DPCA60 (Nippon Kayaku) | 1.07 g |
| (C) Polymerizable compound: 1,6-hexanediol diacrylate (HDDA: manufactured by Daicel UCB) | 9.53 g |
| (D) N-ethyl diethanolamine | 0.29 g |
| (E) Colorant [the above dye (M-1)] | 0.46 g |
| (F) High-boiling organic solvent [the above example (S-6)] | 13.10 g |
| (G) Polymerization initiator [TPO-L, the above (initiator-1)] | 1.81 g |

The above components were mixed and dissolved under stirring, to give magenta liquid (I-00) for ink jet recording. The viscosity of the liquid (I-00) at 25° C. was 19.6 mPa·s.

<Preparation of comparative liquid (I-000) of one-liquid type for ink jet recording>

| | |
|---|---|
| (A) Acid compound [the above compound (A-1)] | 3.56 g |
| (B) Polymerizable compound: DPCA60 (Nippon Kayaku) | 1.07 g |
| (C) Polymerizable compound: 1,6-hexanediol diacrylate (HDDA: manufactured by Daicel UCB) | 8.53 g |
| (D) N-ethyl diethanolamine | 0.29 g |
| (E) Colorant [the above dye (M-1)] | 0.46 g |
| (F) High-boiling organic solvent [the above example (S-6)] | 10.10 g |
| (G) Polymerization initiator [TPO-L, the above (initiator-1)] | 1.81 g |
| (H) Glycerin | 2 g |

4. Evaluation

<Printing Method>

First, printing with the liquid of one-liquid type is described.

The prepared liquid (I-0) for ink jet recording was used in printing on a recording medium by using an ink jet printer (Experimental Machine manufactured by Micro Jet (trade name: Ink Jet Experimental System IJET1000R); printing density, 300 dpi; discharge frequency, 2 KHz; and number of nozzles, 64 (2 rows)).

Also, the prepared liquid (I-00) for ink jet recording was used in printing in the same manner as for the above liquid (I-0) for ink jet recording. The discharge frequency was 4 KHz.

Now, printing with the liquid of two-liquid type is described.

First, the prepared liquids (II-1) to (II-27) for ink jet recording were used in printing respectively in the same manner as for the ink (I-0) for ink jet recording. After each of the prepared liquids (II-1) to (II-27) for ink jet recording was applied, the liquid (I-1) for ink jet recording was printed thereon such that the two liquids were overlapped. Any of the liquids was used in printing on a recording medium by using an ink jet printer (Experimental Machine manufactured by Micro Jet (trade name: Ink Jet Experimental System IJET1000R); printing density, 300 dpi; discharge frequency, 2 KHz; and number of nozzles, 64 (2 rows)).

Two kinds of recording mediums, that is, a polyethylene terephthalate (PET) sheet of 60 μm in thickness (trade name: PPL/Xerox FILM (OHP FILM) for laser printer, manufactured by Fuji Xerox) and an art paper (trade name: Tokubishi Art Ryomen, manufactured by Mitsubishi Paper Mills Limited), were subjected to the printing mentioned above.

After printing, irradiation with UV ray in a UV amount of about 500 mJ/cm$^2$ from a metal halide lamp having a wavelength of 365 nm was carried out to form an image. The resulting image was evaluated for the following items.

<Evaluation of Droplet Interference Performance>

(Line Qualities)

In the printing step described above, the respective liquids were discharged in an overlapped state in the form of a line, and the overlapped state (degree of bleeding) of discharged droplets was evaluated under the following criteria. In the discharge in an overlapped state in the form of a line, the first liquid was discharged such that 5 lines of the first liquid were contacted with one another, and 10 seconds after discharge of the first liquid, the second liquid was discharged in one line thereon. With respect to the one-liquid type liquid (I-0), (I-00)

or (I-000), its first liquid only was discharged in the form of a line and evaluated for the degree of bleeding.

A: The thickness of the line is uniform.

B: Due to gathering of the liquid, the thickness of the line is minutely uneven in some places.

C: Due to gathering of the liquid, the thickness of the line is evidently uneven.

(Solid Image Qualities)

In the printing step described above, the respective liquids were discharged in an overlapped state in the form of a solid image, and the unevenness of density was evaluated under the following criteria. In the discharge in an overlapped state in the form of a solid image, the first liquid was discharged such that 60 lines of the first liquid were contacted with one another, and 10 seconds after discharge of the first liquid, the second liquid was discharged thereon such that 50 lines of the second liquid were contacted with one another. With respect to the one-liquid type liquid (I-0), (I-00) or (I-000), its first liquid only was discharged in the form of a solid image and evaluated for the unevenness of density.

A: The unevenness of density is hardly observed.

B: The unevenness of density is slightly observed, but is not problematic as a whole.

C: The solid image has uneven density and is inferior in qualities.

<Evaluation of Line Color Segregation>

In the printing step described above, the respective liquids were discharged in an overlapped state in the form of a line, and the color segregation of the line was evaluated. With respect to the one-liquid type liquid (I-0), (I-00) or (I-000), its first liquid only was discharged in the form of a line and evaluated for its color segregation.

A: There is no color segregation.

B: Slight color segregation is observed, and in the center, a slight missing part is observed.

C: Significant color segregation occurs, and in the center, a thick missing part is observed.

<Evaluation of Stickiness>

The printed surface was touched with fingers and evaluated under the following criteria.

A: Not sticky.

B: Slightly sticky.

C: Significantly sticky.

<Evaluation of Rubbing Resistance>

The PET sheet/art paper described above were used in printing an image, and 30 minutes later, the printed part of the image was rubbed 10 times with an eraser, and the change after rubbing was evaluated under the following criteria.

A: No fade of color (no drop in density).

B: Slight fade of color.

C: Significant fade of color.

<Evaluation of Light Resistance>

The PET sheet/art paper on which an image had been formed were irradiated for 1 week with a xenon light (85,000 Lux) by using a weather meter (Atlas C.I 65), and the density of the image before and after irradiation was measured with an X-rite 310 densitometer (manufactured by X-rite), and the degree of the remaining colorant was determined from the measurement result and evaluated under the following criteria. The reflection density was measured in about 1.0.

A: The degree of the remaining colorant was 90% or more.

B: The degree of the remaining colorant was 80% or more to less than 90%.

C: The degree of the remaining colorant was 70% or more to less than 80%.

D: The degree of the remaining colorant was 50% or more to less than 70%.

E: The degree of the remaining colorant was less than 50%.

(Evaluation of Ozone Resistance)

The PET sheet/art paper on which an image had been formed were stored for 1 week in an atmosphere containing ozone at a concentration of 5.0 ppm, and the density of the image before and after storage was measured with an X-rite 310 densitometer (manufactured by X-rite), and the degree of the remaining colorant was determined from the measurement result and evaluated under the following criteria.

A: The degree of the remaining colorant was 90% or more.

B: The degree of the remaining colorant was 80% or more to less than 90%.

C: The degree of the remaining colorant was 70% or more to less than 80%.

D: The degree of the remaining colorant was 50% to less than 70%.

E: The degree of the remaining colorant was less than 50%.

The evaluation results are shown in Tables 4 to 6.

TABLE 4

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| I-1/ II-1 | PET Art paper | A A | A A | A A | A A | A A | B B | B B | The invention The invention |
| I-1/ II-2 | PET Art paper | A A | A A | A A | A A | A A | B B | B B | The invention The invention |
| I-1/ II-3 | PET Art paper | A A | A A | A A | A A | A A | B B | B B | The invention The invention |
| I-1/ | PET | A | A | A | A | A | B | B | The invention |

TABLE 4-continued

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| II-4 | Art paper | A | A | A | A | A | B | B | The invention |
| I-1/ II-5 | PET Art paper | A A | A A | A A | A A | A A | B B | B B | The invention The invention |
| I-1/ II-6 | PET Art paper | A A | B B | A A | A A | A A | B B | B B | The invention The invention |
| I-1/ II-7 | PET Art paper | A A | B B | A A | A A | A A | B B | B B | The invention The invention |
| I-1/ II-8 | PET Art paper | A A | B B | A A | A A | A A | B B | B B | The invention The invention |
| I-1/ II-9 | PET Art paper | A A | B B | A A | A A | A A | B B | B B | The invention The invention |

TABLE 5

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| I-1/ II-10 | PET Art paper | A A | A A | A A | A A | A A | B B | B B | The invention The invention |
| I-1/ II-11 | PET Art paper | A A | A A | A A | A A | A A | B B | B B | The invention The invention |
| I-1/ II-12 | PET Art paper | A A | A A | A A | A A | A A | B B | B B | The invention The invention |
| I-1/ II-13 | PET Art paper | A A | A A | A A | A A | A A | B B | B B | The invention The invention |
| I-1/ II-14 | PET Art paper | A A | A A | A A | A A | A A | B B | B B | The invention The invention |
| I-1/ II-15 | PET Art paper | A A | B B | A A | A A | A A | B B | B B | The invention The invention |
| I-1/ II-16 | PET Art paper | A A | B B | A A | A A | A A | B B | B B | The invention The invention |
| I-1/ II-17 | PET Art paper | A A | B B | A A | A A | A A | B B | B B | The invention The invention |
| I-1/ II-18 | PET Art paper | A A | B B | A A | A A | A A | B B | B B | The invention The invention |

TABLE 6

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| I-1/ II-19 | PET Art paper | A A | A A | A A | A A | A A | B B | B B | The invention The invention |
| I-1/ II-20 | PET Art paper | A A | A A | A A | A A | A A | B B | B B | The invention The invention |
| I-1/ II-21 | PET Art paper | A A | A A | A A | A A | A A | B B | B B | The invention The invention |

TABLE 6-continued

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| I-1/ | PET | A | A | A | A | A | B | B | The invention |
| II-22 | Art paper | A | A | A | A | A | B | B | The invention |
| I-1/ | PET | A | A | A | A | A | B | B | The invention |
| II-23 | Art paper | A | A | A | A | A | B | B | The invention |
| I-1/ | PET | A | B | A | A | A | B | B | The invention |
| II-24 | Art paper | A | B | A | A | A | B | B | The invention |
| I-1/ | PET | A | B | A | A | A | B | B | The invention |
| II-25 | Art paper | A | B | A | A | A | B | B | The invention |
| I-1/ | PET | A | B | A | A | A | B | B | The invention |
| II-26 | Art paper | A | B | A | A | A | B | B | The invention |
| I-1/ | PET | A | B | A | A | A | B | B | The invention |
| II-27 | Art paper | A | B | A | A | A | B | B | The invention |
| I-0 | PET | C | C | A | A | A | B | B | Comparative Example |
|  | Art paper | B | C | A | A | A | B | B | Comparative Example |
| I-00 | PET | C | C | A | A | A | B | B | Comparative Example |
|  | Art paper | B | C | A | A | A | B | B | Comparative Example |
| I-000 | PET | C | C | A | A | A | B | B | Comparative Example |
|  | Art paper | B | C | A | A | A | B | B | Comparative Example |

From Tables 4 to 6, it is revealed that when the 2-liquid type liquid for ink jet recording, wherein a colorant was contained in one liquid and the oil-soluble polymer in the invention was contained in the other liquid, was used in printing such that the 2 liquids were overlapped, an image without color segregation was rapidly formed without interference of discharged droplets on the PET sheet or the art paper, not absorbing ink. In the invention, it is also revealed that by irradiation with UV ray in a UV amount of about 500 mJ/cm$^2$ from a metal halide lamp having a wavelength of 365 nm, curing reaction can proceed efficiently and rapidly to give a stickiness-free image excellent in printing performance and having high rubbing resistance, light resistance and ozone resistance.

On the other hand, it is revealed that the sample having the one-liquid type ink discharged thereon has stable image qualities with high rubbing resistance, light resistance and ozone resistance without stickiness, but undergoes interference between discharged droplets on the PET sheet or art paper, and is poor in image formation and problematic from the viewpoint of high-quality image.

The above color segregation is a phenomenon where in a liquid containing fine particles of pigment etc., an excess stream is generated due to difference in temperature, difference in solvent concentration, difference in curing speed etc., and owing to differences in particle size, specific gravity and electric charge, there occurs a difference in mobility by which the pigment and the solvent (monomer) are separated from each other. When the color segregation is generated upon discharge in line in the ink jet system, the colorant gathers only around liquid droplets, and in the center, the colorant is missing.

Example 2

An experiment was carried out in the same manner as in the preparation of the second liquid in Example 1 except that a phthalocyanine pigment was used in place of the dye (M-1). Hereinafter, the composition of the liquid using the pigment is shown below.

| <Preparation of liquid (III-1) for ink jet recording> | |
|---|---|
| (A) Acid compound [the above compound (A-1)] | 0.22 g |
| (B) Polymerizable compound: DPCA60 (Nippon Kayaku) | 0.38 g |
| (C) Polymerizable compound: 1,6-hexanediol diacrylate (HDDA: manufactured by Daicel UCB) | 11.70 g |
| (D) N-ethyl diethanolamine | 0.20 g |
| (E) Colorant [pigment: copper phthalocyanine (PB15:3)] (trade name: Irgalite Blue GLO, manufactured Ciba Speciality Chemicals) | 1.40 g |

The above components were mixed and dissolved under stirring, to give cyan liquid (III-1) for ink jet recording. The viscosity of the liquid (III-1) at 25° C. was 19.8 mPa·s.

The pigment was dispersed beforehand at 20 mass % in 1,6-hexanediol diacrylate in a ball mill (ball mill pot made of hard glass, ball mill rotating holder 1-stage system/A type, manufactured by Horie Shokai) with a dispersant Solsperse 3200 (manufactured by Zeneca).

The respective components were added in the amounts described above.

<Preparation of comparative one-liquid type liquid (III-0) for ink jet recording>

| | |
|---|---|
| (A) Acid compound [the above compound (A-1)] | 0.22 g |
| (B) Polymerizable compound: DPCA60 (Nippon Kayaku) | 0.38 g |
| (C) Polymerizable compound: 1,6-hexanediol diacrylate (HDDA: manufactured by Daicel UCB) | 10.89 g |
| (D) N-ethyl diethanolamine | 0.20 g |
| (E) Colorant [pigment: copper phthalocyanine (PB15:3)] (trade name: Irgalite Blue GLO, manufactured Ciba Speciality Chemicals) | 1.40 g |
| (G) Polymerization initiator [TPO-L, the above (initiator-1)] | 1.81 g |

The above components were mixed and dissolved under stirring, to give cyan liquid (III-0) for ink jet recording. The viscosity of the liquid (III-0) at 25° C. was 19.8 mPa·s.

The pigment was dispersed beforehand at 20 mass % in 1,6-hexanediol diacrylate in a ball mill (ball mill pot made of hard glass, ball mill rotating holder 1-stage system/A type, manufactured by Horie Shokai) with a dispersant Solsperse 3200 (manufactured by Zeneca).

The respective components were added in the amounts described above.

<Preparation of comparative one-liquid type liquid (III-00) for ink jet recording>

| | |
|---|---|
| (A) Acid compound [the above compound (A-1)] | 0.22 g |
| (B) Polymerizable compound: DPCA60 (Nippon Kayaku) | 0.38 g |
| (C) Polymerizable compound: 1,6-hexanediol diacrylate (HDDA: manufactured by Daicel UCB) | 12.70 g |
| (D) N-ethyl diethanolamine | 0.20 g |
| (E) Colorant [pigment: copper phthalocyanine (PB15:3)] (trade name: Irgalite Blue GLO, manufactured Ciba Speciality Chemicals) | 1.40 g |

-continued

<Preparation of comparative one-liquid type liquid (III-00) for ink jet recording>

| | |
|---|---|
| (F) High-boiling organic solvent [the above example (S-6)] | 13.10 g |
| (G) Polymerization initiator [TPO-L, the above (initiator-1)] | 1.81 g |

The above components were mixed and dissolved under stirring, to give cyan liquid (III-00) for ink jet recording. The viscosity of the liquid (III-00) at 25° C. was 19.8 mPa·s.

The pigment was dispersed beforehand at 20 mass % in 1,6-hexanediol diacrylate in a ball mill (ball mill pot made of hard glass, ball mill rotating holder 1-stage system/A type, manufactured by Horie Shokai) with a dispersant Solsperse 3200 (manufactured by Zeneca).

The respective components were added in the amounts described above.

<Preparation of comparative one-liquid type liquid (III-000) for ink jet recording>

| | |
|---|---|
| (A) Acid compound [the above compound (A-1)] | 0.22 g |
| (B) Polymerizable compound: DPCA60 (Nippon Kayaku) | 0.38 g |
| (C) Polymerizable compound: 1,6-hexanediol diacrylate (HDDA: manufactured by Daicel UCB) | 11.60 g |
| (D) N-ethyl diethanolamine | 0.20 g |
| (E) Colorant [pigment: copper phthalocyanine (PB15:3)] (trade name: Irgalite Blue GLO, manufactured Ciba Speciality Chemicals) | 1.40 g |
| (F) High-boiling organic solvent [the above example (S-6)] | 10.10 g |
| (G) Polymerization initiator [TPO-L, the above (initiator-1)] | 1.81 g |
| (H) Glycerin | 2 g |

Printing on a recording medium and evaluation were carried out in the same manner as in Example 1 except that the liquids (III-1), (III-0), (III-00) and (III-000) for ink jet recording were used in place of (I-1), (I-0), (I-00) and (I-000). The results are shown in Tables 7 to 9.

TABLE 7

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| III-1/ II-1 | PET Art paper | A A | A A | A A | A A | A A | A A | A A | The invention The invention |
| III-1/ II-2 | PET Art paper | A A | A A | A A | A A | A A | A A | A A | The invention The invention |
| III-1/ II-3 | PET Art paper | A A | A A | A A | A A | A A | A A | A A | The invention The invention |
| III-1/ II-4 | PET Art paper | A A | A A | A A | A A | A A | A A | A A | The invention The invention |
| III-1/ II-5 | PET Art paper | A A | A A | A A | A A | A A | A A | A A | The invention The invention |
| III-1/ II-6 | PET Art paper | A A | A A | A A | A A | A A | A A | A A | The invention The invention |
| III-1/ II-7 | PET Art paper | A A | A A | A A | A A | A A | A A | A A | The invention The invention |
| III-1/ II-8 | PET Art paper | A A | A A | A A | A A | A A | A A | A A | The invention The invention |

TABLE 7-continued

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| III-1/ | PET | A | A | A | A | A | A | A | The invention |
| II-9 | Art paper | A | A | A | A | A | A | A | The invention |

TABLE 8

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| III-1/ | PET | A | A | A | A | A | A | A | The invention |
| II-10 | Art paper | A | A | A | A | A | A | A | The invention |
| III-1/ | PET | A | A | A | A | A | A | A | The invention |
| II-11 | Art paper | A | A | A | A | A | A | A | The invention |
| III-1/ | PET | A | A | A | A | A | A | A | The invention |
| II-12 | Art paper | A | A | A | A | A | A | A | The invention |
| III-1/ | PET | A | A | A | A | A | A | A | The invention |
| II-13 | Art paper | A | A | A | A | A | A | A | The invention |
| III-1/ | PET | A | A | A | A | A | A | A | The invention |
| II-14 | Art paper | A | A | A | A | A | A | A | The invention |
| III-1/ | PET | A | A | A | A | A | A | A | The invention |
| II-15 | Art paper | A | A | A | A | A | A | A | The invention |
| III-1/ | PET | A | A | A | A | A | A | A | The invention |
| II-16 | Art paper | A | A | A | A | A | A | A | The invention |
| III-1/ | PET | A | A | A | A | A | A | A | The invention |
| II-17 | Art paper | A | A | A | A | A | A | A | The invention |
| III-1/ | PET | A | A | A | A | A | A | A | The invention |
| II-18 | Art paper | A | A | A | A | A | A | A | The invention |

TABLE 9

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| III-1/ | PET | A | A | A | A | A | A | A | The invention |
| II-19 | Art paper | A | A | A | A | A | A | A | The invention |
| III-1/ | PET | A | A | A | A | A | A | A | The invention |
| II-20 | Art paper | A | A | A | A | A | A | A | The invention |
| III-1/ | PET | A | A | A | A | A | A | A | The invention |
| II-21 | Art paper | A | A | A | A | A | A | A | The invention |
| III-1/ | PET | A | A | A | A | A | A | A | The invention |
| II-22 | Art paper | A | A | A | A | A | A | A | The invention |
| III-1/ | PET | A | A | A | A | A | A | A | The invention |
| II-23 | Art paper | A | A | A | A | A | A | A | The invention |
| III-1/ | PET | A | A | A | A | A | A | A | The invention |
| II-24 | Art paper | A | A | A | A | A | A | A | The invention |
| III-1/ | PET | A | A | A | A | A | A | A | The invention |
| II-25 | Art paper | A | A | A | A | A | A | A | The invention |
| III-1/ | PET | A | A | A | A | A | A | A | The invention |
| II-26 | Art paper | A | A | A | A | A | A | A | The invention |

TABLE 9-continued

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| III-1/ II-27 | PET | A | A | A | A | A | A | A | The invention |
|  | Art paper | A | A | A | A | A | A | A | The invention |
| III-0 | PET | C | C | A | A | A | A | A | Comparative Example |
|  | Art paper | B | C | A | A | A | A | A | Comparative Example |
| III-00 | PET | C | C | A | A | A | A | A | Comparative Example |
|  | Art paper | B | C | A | A | A | A | A | Comparative Example |
| III-000 | PET | C | C | A | A | A | A | A | Comparative Example |
|  | Art paper | B | C | A | A | A | A | A | Comparative Example |

From Tables 7 to 9, it is revealed that when the 2-liquid type liquid for ink jet recording, wherein the pigment was contained as a colorant in one liquid and the oil-soluble polymer in the invention was contained in the other liquid, was used in printing such that the 2 liquids were overlapped, an image without color segregation was rapidly formed without interference of discharged droplets on the PET sheet, or the art paper, not absorbing ink. In the invention, it is also revealed that by irradiation with UV ray in a UV amount of about 500 mJ/cm² from a metal halide lamp having a wavelength of 365 nm, curing reaction can proceed efficiently and rapidly to give a stickiness-free image excellent in printing performance and having high rubbing resistance, light resistance and ozone resistance.

When the pigment is used, light resistance and ozone resistance are further improved, and even when the polymer in the invention observed to cause slight unevenness in Example 1 where a dye is used, an image free of unevenness can be obtained by using the pigment as a colorant.

Comparative Example

A liquid having the following composition was prepared and then evaluated in the same manner as in Example 1. The results are shown in Table 10.

<Comparative liquid I-X for ink jet recording>

| (A) Unideck SI-929 (Dainippon Ink and Chemicals) | 20 g |
| (B) The following dye X | 1.5 g |

-continued

<Comparative liquid I-X for ink jet recording>

| (C) Water | 68.5 cc |
| (D) Glycerin (Wako Pure Chemical Industries, Ltd.) | 10 g |

<Comparative liquid II-X for ink jet recording>

| (A) Water | 97 cc |
| (B) Dirocure 2529 (Merck) | 3 g |

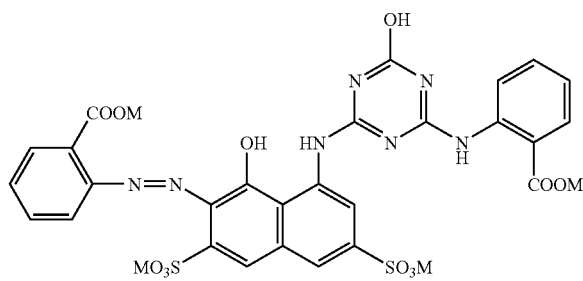

Dye X

TABLE 10

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| I-X/ II-X | PET | C | C | A | A | A | C | C | Comparative Example |
|  | Art paper | C | C | A | A | A | C | C | Comparative Example |

It was found from Table 10 that when the oil-soluble polymer in the invention is not used and water is used as a solvent in the recording method of using a photo-setting resin on one liquid and a photopolymerization initiator in the other liquid, the thickness of the resulting line is varied, and the resulting solid image has uneven density to show inferior light resistance and ozone resistance.

Example 3

Printing and evaluation were carried out in the same manner as in Example 2 except that out of the liquids prepared in Example 2, the 2-liquid type liquids (III-1) and (II-1) to (II-27) for ink jet recording were used, and application of the liquids (II-1) to (II-27) onto recording mediums was carried out by a rod coater (manufactured by Matsubo). The same results as in Example 2 could be obtained.

Example 4

Preparation of Liquids (IV-1) to (IV-27) for Ink Jet Recording Containing the Polymer of the Invention The liquids (IV-1) to (IV-27) for ink jet recording were prepared in the same manner as in preparation of the liquids (II-1) to (II-27) for ink jet recording prepared in Example 1 except that the amount of the polymer of the invention was changed to 12 g.

Then, evaluation was carried out in the same manner as in Example 3 except that the liquids (IV-1) to (IV-27) for ink jet recording were used in place of (II-1) to (II-27). The same excellent effect as in Example 3 was obtained in these cases, too.

Example 5

The same experiment as in Example 1 was carried out except that while the preparation in Example 1 was conducted by incorporation of the polymerizable compound into the second liquid only, the preparation in Example 5 was conducted by incorporation of the polymerizable compound into both the first and second liquids. The experiment was further conducted by changing the type of the polymerizable compound in the second liquid. Compositions of the first and second liquids in Example 5 are shown below.

1. Preparation of the Second Liquid

<Preparation of liquid (I'-1) for ink jet recording>

| | |
|---|---|
| (A) Acid compound [the above compound (A-1)] | 3.56 g |
| (B) Polymerizable compound: DPCA60 (Nippon Kayaku) | 0.87 g |
| (C) Polymerizable compound: 1,6-hexanediol diacrylate (HDDA: manufactured by Daicel UCB) | 6.93 g |
| (D) N-ethyl diethanolamine | 0.29 g |
| (E) Colorant [the above dye (M-1)] | 0.46 g |
| (F) Polymerization initiator (TPO-L, the above (initiator-1)) | 1.8 g |

The above components were mixed and dissolved under stirring, to give magenta liquid (I'-1) for ink jet recording. The viscosity of the liquid (I'-1) for ink jet recording at 25° C. was 19.6 cp. Thereafter, the viscosity at 25° C. was measured, and its value was described.

<Preparation of liquid (I'-11) for ink jet recording>
- Composition wherein one of the polymerizable compounds in liquid (I'-1) for ink jet recording was changed -

| | |
|---|---|
| (A) Acid compound [the above compound (A-1)] | 3.56 g |
| (B) Polymerizable compound: DPCA60 (Nippon Kayaku) | 0.87 g |
| (C) Polymerizable compound: ACMO (Kojin) | 6.93 g |
| (D) N-ethyl diethanolamine | 0.29 g |
| (E) Colorant [the above dye (M-1)] | 0.46 g |
| (F) Polymerization initiator [TPO-L, the above (initiator-1)] | 1.8 g |

The above components were mixed and dissolved under stirring, to give magenta liquid (I'-11) for ink jet recording. The viscosity of the liquid (I'-11) for ink jet recording at 25° C. was 23.5 cp.

2. Preparation of the First Liquid

<Preparation of liquid (II-31) for ink jet recording containing the polymer of the invention>

| | |
|---|---|
| (G) High-boiling organic solvent (the above example (S-32)) | 2 g |
| (H) Polymerization initiator (TPO-L, the above (initiator-1)) | 1.8 g |
| (I) Polymer of the invention (the above example P1-1) | 2 g |
| (J) Polymerizable compound: DPCA60 (Nippon Kayaku) | 1.1 g |
| (K) Polymerizable compound: 1,6-hexanediol diacrylate (HDDA: manufactured by Daicel UCB) | 8.7 g |

<Preparation of Liquids (II-32) to (II-36) for Ink Jet Recording Containing the Polymer of the Invention>

The liquids (II-32) to (II-36) for ink jet recording containing the polymer of the invention were prepared in the same manner as in preparation of the liquid (II-31) for ink jet recording except that the weight of the polymer of the invention was changed as shown in Table 11 below.

<Preparation of liquid (II-41) for ink jet recording containing the polymer of the invention>

| | |
|---|---|
| (G) High-boiling organic solvent (the above example (S-1)) | 2 g |
| (H) Polymerization initiator (TPO-L, the above (initiator-1)) | 1.8 g |
| (I) Polymer of the invention (the above example P1-1) | 2 g |
| (J) Polymerizable compound: DPCA60 (Nippon Kayaku) | 1.1 g |
| (K) Polymerizable compound: ACMO (Kojin) | 8.7 g |

<Preparation of Liquids (II-42) to (II-43) for Ink Jet Recording Containing the Polymer of the Invention>

The colorant-free liquids (II-42) to (II-43) for ink jet recording were prepared in the same manner as in preparation of the liquid (II-41) for ink jet recording except that the same weight of the polymer of the invention was changed as shown in Table 11 below.

The types of the polymer and polymerizable compound used in preparation of the first liquid and the viscosity of the first liquid at 25° C. are shown in Table 11.

TABLE 11

| | Polymer | | |
|---|---|---|---|
| Compound No. | Weight-average molecular weight | Polymerizable compound (type) | Viscosity (cp) |
| II-31 P1-1 | 8000 | DPCA60/HDDA | 19.6 |
| II-32 P1-3 | 7500 | DPCA60/HDDA | 19.6 |
| II-33 P2-1 | 7500 | DPCA60/HDDA | 19.6 |
| II-34 P2-4 | 8500 | DPCA60/HDDA | 19.6 |
| II-35 P3-1 | 8000 | DPCA60/HDDA | 19.6 |
| II-36 P3-5 | 7500 | DPCA60/HDDA | 19.6 |
| II-41 P1-1 | 8000 | DPCA60/ACMO | 23.5 |
| II-42 P2-1 | 7500 | DPCA60/ACMO | 23.5 |
| II-43 P3-1 | 8000 | DPCA60/ACMO | 23.5 |

Printing on a recording medium and evaluation were carried out in the same manner as in Example 1 except that the liquids (I'-1) and (I'-11) for ink jet recording were used respectively in place of (I-1), (I-0) and (I-00), and the liquids (II-31) to (II-36) and (II-41) to (II-43) for ink jet recording were used respectively in place of (II-1) to (II-29). The results are shown in Table 12.

TABLE 12

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| I'-1/ | PET | A | A | A | A | A | B | B | The invention |
| II-31 | Art paper | A | A | A | A | A | B | B | The invention |
| I'-1/ | PET | A | A | A | A | A | B | B | The invention |
| II-32 | Art paper | A | A | A | A | A | B | B | The invention |
| I'-1/ | PET | A | A | A | A | A | B | B | The invention |
| II-33 | Art paper | A | A | A | A | A | B | B | The invention |
| I'-1/ | PET | A | A | A | A | A | B | B | The invention |
| II-34 | Art paper | A | A | A | A | A | B | B | The invention |
| I'-1/ | PET | A | A | A | A | A | B | B | The invention |
| II-35 | Art paper | A | A | A | A | A | B | B | The invention |
| I'-1/ | PET | A | A | A | A | A | B | B | The invention |
| II-36 | Art paper | A | A | A | A | A | B | B | The invention |
| I'-1/ | PET | A | A | A | A | A | B | B | The invention |
| II-41 | Art paper | A | A | A | A | A | B | B | The invention |
| I'-1/ | PET | A | A | A | A | A | B | B | The invention |
| II-42 | Art paper | A | A | A | A | A | B | B | The invention |
| I'-1/ | PET | A | A | A | A | A | B | B | The invention |
| II-43 | Art paper | A | A | A | A | A | B | B | The invention |

From Table 12, it is revealed that when the 2-liquid type liquid for ink jet recording, wherein a colorant was contained in one liquid, the oil-soluble polymer in the invention was contained in the other liquid, and a polymerizable compound was contained in both the liquids, was used in printing such that the 2 liquids were overlapped, an image without color segregation was rapidly formed without interference of discharged droplets on the PET sheet, or the art paper, not absorbing ink. In the invention, it is also revealed that by irradiation with UV ray in a UV amount of about 500 mJ/cm$^2$ from a metal halide lamp having a wavelength of 365 nm, curing reaction can proceed efficiently and rapidly to give a stickiness-free image excellent in printing performance and having high rubbing resistance, light resistance and ozone resistance. When an ink composition containing both the polymerizable compound and the polymerization initiator was used in ink jet printing, clogging of nozzles was observed during printing for a long time. Clogging of nozzles was prevented by incorporation of a colorant into the ink containing both the polymerizable compound and the polymerization initiator.

Example 6

An experiment was carried out in the same manner as in Example 5 except that a phthalocyanine pigment was used in place of the dye (M-1) in preparation of the second liquid, and the polymerization initiator was not used in preparation of the first liquid. A composition of the liquid using the pigment is shown below.

1. Preparation of the Second Liquid

| <Preparation of liquid (III'-1) for ink jet recording> | |
|---|---|
| (A) Acid compound [the above compound (A-1)] | 0.22 g |
| (B) Polymerizable compound: DPCA60 (Nippon Kayaku) | 0.32 g |
| (C) Polymerizable compound: 1,6-hexanediol diacrylate (HDDA: manufactured by Daicel UCB) | 9.86 g |
| (D) N-ethyl diethanolamine | 0.20 g |

-continued

<Preparation of liquid (III'-1) for ink jet recording>

| | |
|---|---|
| (E) Colorant [pigment: copper phthalocyanine (PB15:3)] (trade name: Irgalite Blue GLO, manufactured Ciba Speciality Chemicals) | 1.40 g |
| (F) Polymerization initiator [TPO-L, the above (initiator-1)] | 1.8 g |

The above components were mixed and dissolved under stirring, to give cyan liquid (III'-1) for ink jet recording. The viscosity of the liquid (III'-1) at 25° C. was 19.8 mPa·s.

The pigment was dispersed beforehand at 20 mass % in 1,6-hexanediol diacrylate in a ball mill (ball mill pot made of hard glass, ball mill rotating holder 1-stage system/A type, manufactured by Horie Shokai) with a dispersant Solsperse 3200 (manufactured by Zeneca).

The respective components were added in the amounts described above.

<Preparation of liquid (III'-2) for ink jet recording>

| | |
|---|---|
| (A) Acid compound [the above compound (A-1)] | 0.22 g |
| (B) Polymerizable compound: DPCA60 (Nippon Kayaku) | 0.32 g |
| (C) Polymerizable compound: ACMO (Kojin) | 9.86 g |
| (D) N-ethyl diethanolamine | 0.20 g |
| (E) Colorant (pigment: phthalocyanine) (trade name: Irgalite Blue GLO, manufactured Ciba Speciality Chemicals) | 1.40 g |
| (F) Polymerization initiator (TPO-L, the above (initiator-1)) | 1.8 g |

The above components were mixed and dissolved under stirring, to give cyan liquid (III'-2) for ink jet recording. The viscosity of the liquid (III'-2) for ink jet recording at 25° C. was 23.5 cp.

The pigment was dispersed beforehand at 20 mass % in 1,6-hexanediol diacrylate in a ball mill (ball mill pot made of hard glass, ball mill rotating holder 1-stage system/A type, manufactured by Horie Shokai) with a dispersant Solsperse 3200 (manufactured by Zeneca). The respective components were added in the amounts described above.

2. Preparation of the First Liquid

<Preparation of liquid (II'-31) for ink jet recording containing the polymer of the invention>

| | |
|---|---|
| (G) High-boiling organic solvent (the above example (S-32)) | 2 g |
| (I) Polymer of the invention (the above example P1-1) | 2 g |
| (J) Polymerizable compound: DPCA60 (Nippon Kayaku) | 1.1 g |
| (K) Polymerizable compound: 1,6-hexanediol diacrylate (HDDA: manufactured by Daicel UCB) | 10.5 g |

<Preparation of Liquids (II'-32) to (II'-36) for Ink Jet Recording Containing the Polymer of the Invention>

The liquids (II'-32) to (II'-36) for ink jet recording containing the polymer of the invention were prepared in the same manner as in preparation of the liquid (II'-31) for ink jet recording except that the same weight of the polymer of the invention was changed as shown in Table 13 below.

<Preparation of liquid (II'-41) for ink jet recording containing the polymer of the invention>

| | |
|---|---|
| (G) High-boiling organic solvent (the above example (S-1)) | 2 g |
| (I) Polymer of the invention (the above example P1-1) | 2 g |
| (J) Polymerizable compound: DPCA60 (Nippon Kayaku) | 1.1 g |
| (K) Polymerizable compound: ACMO (Kojin) | 10.5 g |

<Preparation of Liquids (II'-42) to (II'-43) for Ink Jet Recording Containing the Polymer of the Invention>

The colorant-free liquids (II'-42) to (II'-43) for ink jet recording were prepared in the same manner as in preparation of the liquid (II'-41) for ink jet recording except that the same weight of the polymer of the invention was changed as shown in Table 13 below.

The types of the polymer and polymerizable compound used in preparation of the first liquid and the viscosity of the first liquid at 25° C. are shown in Table 13.

TABLE 13

| | Polymer | | | |
|---|---|---|---|---|
| | Compound No. | Weight-average molecular weight | Polymerizable compound (type) | Viscosity (cp) |
| II'-31 | P1-1 | 8000 | DPCA60/HDDA | 19.6 |
| II'-32 | P1-3 | 7500 | DPCA60/HDDA | 19.6 |
| II'-33 | P2-1 | 7500 | DPCA60/HDDA | 19.6 |
| II'-34 | P2-4 | 8500 | DPCA60/HDDA | 19.6 |
| II'-35 | P3-1 | 8000 | DPCA60/HDDA | 19.6 |
| II'-36 | P3-5 | 7500 | DPCA60/HDDA | 19.6 |
| II'-41 | P1-1 | 8000 | DPCA60/ACMO | 23.5 |
| II'-42 | P2-1 | 7500 | DPCA60/ACMO | 23.5 |
| II'-43 | P3-1 | 8000 | DPCA60/ACMO | 23.5 |

Printing on a recording medium and evaluation were carried out in the same manner as in Example 5 except that the liquids (III'-1) and (III'-2) for ink jet recording were used respectively in place of (I'-1) and (I'-11), and the liquids (II'-31) to (II'-36) and (II'-41) to (II'-43) for ink jet recording were used respectively in place of (II-31) to (II-36) and (II-41) to (II-43). The results are shown in Table 14.

TABLE 14

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| III'-1/ II'-31 | PET Art paper | A A | A A | A A | A A | A A | A A | A A | The invention The invention |
| III'-1/ II'-32 | PET Art paper | A A | A A | A A | A A | A A | A A | A A | The invention The invention |

TABLE 14-continued

| Liquid for ink jet recording | Recording medium | Line qualities | Solid image qualities | Line color segregation | Stickiness | Rubbing resistance | Light resistance | Ozone resistance | Note |
|---|---|---|---|---|---|---|---|---|---|
| III'-1/ II'-33 | PET Art paper | A A | A A | A A | A A | A A | A A | A A | The invention The invention |
| III'-1/ II'-34 | PET Art paper | A A | A A | A A | A A | A A | A A | A A | The invention The invention |
| III'-1/ II'-35 | PET Art paper | A A | A A | A A | A A | A A | A A | A A | The invention The invention |
| III'-1/ II'-36 | PET Art paper | A A | A A | A A | A A | A A | A A | A A | The invention The invention |
| III'-2/ II'-41 | PET Art paper | A A | A A | A A | A A | A A | A A | A A | The invention The invention |
| III'-2/ II'-42 | PET Art paper | A A | A A | A A | A A | A A | A A | A A | The invention The invention |
| III'-2/ II'-43 | PET Art paper | A A | A A | A A | A A | A A | A A | A A | The invention The invention |

From Table 14, it is revealed that when the 2-liquid type liquid for ink jet recording, wherein the pigment was used as a colorant, the colorant was contained in one liquid, the oil-soluble polymer in the invention was contained in the other liquid, and a polymerizable compound in both the liquids, was used in printing such that the 2 liquids were overlapped, an image without color segregation was rapidly formed without interference of discharged droplets on the PET sheet, or the art paper, not absorbing ink. In the invention, it is also revealed that by irradiation with UV ray in a UV amount of about 500 mJ/cm² from a metal halide lamp having a wavelength of 365 nm, curing reaction can proceed efficiently and rapidly to give a stickiness-free image excellent in printing performance and having high rubbing resistance, light resistance and ozone resistance.

When the pigment is used, light resistance and ozone resistance can further be improved to give an image free of unevenness.

Example 7

Printing and evaluation were carried out in the same manner as in Example 6 except that out of the liquids prepared in Example 6, the 2-liquid type liquids (III'-1) and (II'-31) to (II'-36) for ink jet recording were used, and application of the liquids (II'-31) to (II'-36) onto recording mediums was carried out by a rod coater (manufactured by Matsubo). The same results as in Example 6 could be obtained.

Example 8

Preparation of Liquids (IV-31) to (IV-36) for Inkjet Recording Containing the Polymer of the Invention The liquids (IV-31) to (IV-36) for ink jet recording were prepared in the same manner as in preparation of the liquids (II-31) to (II-36) for ink jet recording prepared in Example 5 except that the amount of the polymer of the invention was changed to 12 g.

Then, samples were prepared in the same manner as in Example 7 except that the liquids (IV-31) to (IV-36) for ink jet recording were used in place of the liquids (II'-31) to (II'-36) for ink jet recording. The resulting samples were evaluated in the same manner as in Example 7. The same excellent effect as in Example 7 was obtained in these cases, too.

INDUSTRIAL APPLICABILITY

The present invention can be applied to ink jet recording capable of forming a high-quality image maintaining long-term storage stability and excellent fixability and suppressing bleeding and interference between adjacently discharged ink droplets.

The invention claimed is:

1. An ink set for ink jet recording comprising a plurality of liquids containing at least a first liquid and a second liquid,
   wherein the first liquid comprises an oil-soluble polymer dissolved therein,
   at least one of a plurality of the liquids contains a polymerizable compound,
   the oil-soluble polymer is at least one member selected from the group consisting of a polymer having a nitrogen-containing heterocycle and a polymer having an amino group,
   the polymer having a nitrogen-containing heterocycle is a polymer having at least one member selected from the group consisting of N-vinyl imidazole, 2-vinyl pyridine and 4-vinyl pyridine, and
   the polymer having an amino group is a polymer having a unit represented by the following formula (3):

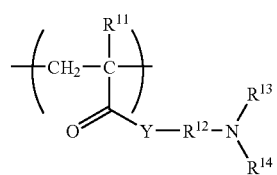

Formula (3)

wherein $R^{11}$ represents a hydrogen atom or a methyl group, Y represents O or $NR^{15}$, $R^{15}$ represents a hydrogen atom or an alkyl group, $R^{12}$ represents a divalent linking group, and $R^{13}$ and $R^{14}$ independently represent an alkyl group, aralkyl group or aryl group.

2. The ink set for ink jet recording of claim 1, wherein the second liquid contains a colorant.

3. The ink set for ink jet recording of claim 1, wherein the second liquid contains the polymerizable compound.

4. The ink set for ink jet recording of claim 1, wherein the weight-average molecular weight of the oil-soluble polymer is 1,000 to 50,000.

5. The ink set for ink jet recording of claim 1, wherein a high-boiling organic solvent is contained in at least one of the liquids containing the oil-soluble polymer.

6. The ink set for ink jet recording of claim 1, wherein if a plurality of the liquids contain a solvent, the solvent does not substantially contain a water-soluble liquid.

7. The ink set for ink jet recording according to claim 1, wherein the nitrogen-containing heterocycle is any one of the following (P3-1) to (P3-12):

and the polymer having an amino group is any one of the following (P1-1) to (P1-14):

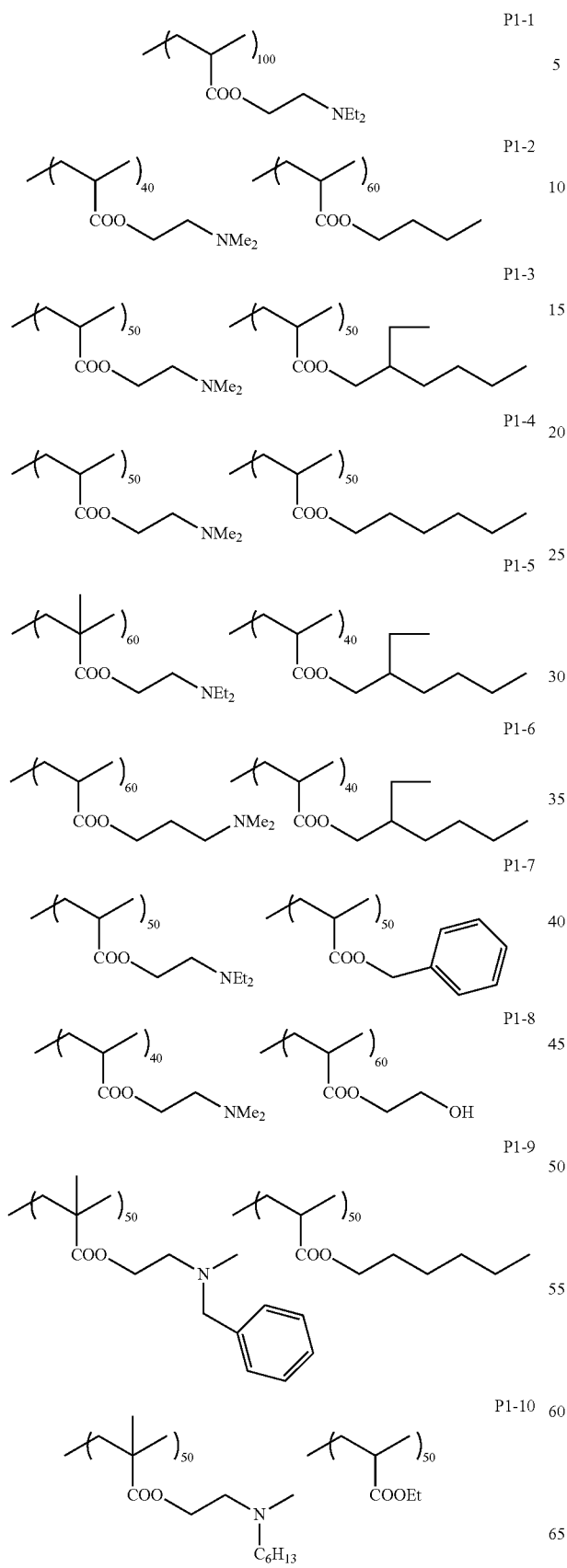

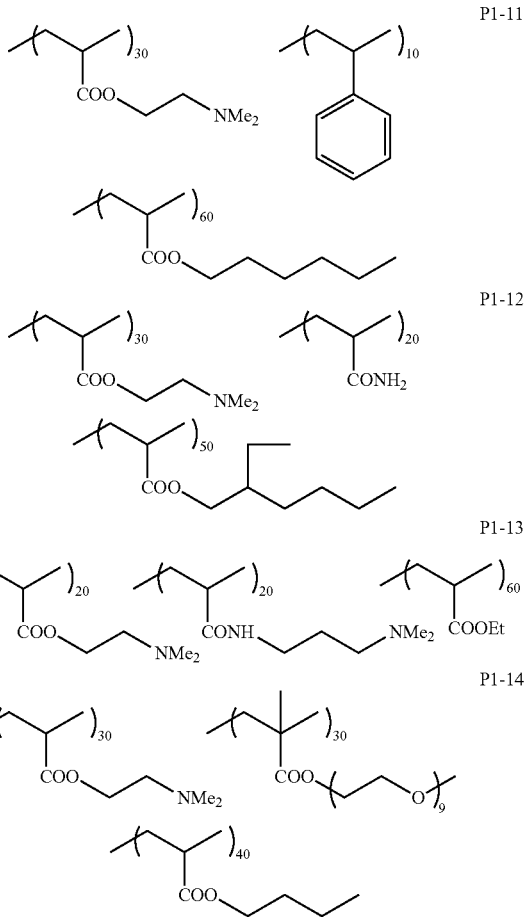

8. The ink set for ink jet recording according to claim 7, wherein:
the second liquid contains the polymerizable compound;
the first liquid further comprises a high-boiling organic solvent and a polymerization initiator;
the second liquid further comprises a colorant; and
the high-boiling organic solvent is a compound represented by any one of the following formulae [S-1] and [S-5]:

$$O=P\begin{array}{c}(O)_a-R_1\\(O)_b-R_2\\(O)_c-R_3\end{array}$$

Formula [S-1]

wherein, in the formula [S-1], $R_1$, $R_2$ and $R_3$ independently represent an aliphatic group or an aryl group; and a, b and c independently represent 0 or 1;

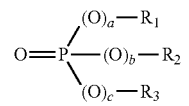

Formula [S-5]

wherein, in the formula [S-5], g represents an integer of 2 to 6, $R_{10}$ represents a g-valent hydrocarbon group excluding an aryl group, and $R_{11}$ represents an aliphatic group or an aryl group.

9. An ink jet image recording method which comprises using the ink set for ink jet recording having a plurality of liquids containing at least the first and second liquids of claim 1, and applying the first and second liquids simultaneously onto a recording medium, or first applying one of the liquids and then the other onto a recording medium such that the two liquids contact each other, thus forming an image.

10. The ink jet image recording method of claim 9, wherein the first liquid is applied onto a recording medium and simultaneously or thereafter the second liquid is jetted through ink jet nozzles, thereby forming an image.

11. The ink jet image recording method of claim 9, wherein the means of applying the first liquid onto a recording medium is coating by an applicator, and after the first liquid is applied, the second liquid is jetted via ink jet nozzles.

12. The ink jet image recording method of claim 9, wherein the means of applying the first and second liquids onto a recording medium is jetting through ink jet nozzles.

13. The ink jet image recording method of claim 9, further comprising fixing an image formed on a recording medium by applying energy to the image.

* * * * *